United States Patent
Hama et al.

(10) Patent No.: US 10,640,670 B2
(45) Date of Patent: May 5, 2020

(54) FILM-FORMING COMPOSITION AND MANUFACTURING METHOD OF LAMINATE

(71) Applicant: FUJIFILM CORPORATION, Minato-ku, Tokyo (JP)

(72) Inventors: Takeshi Hama, Shizuoka (JP); Yusuke Hatanaka, Shizuoka (JP); Naoki Koito, Shizuoka (JP); AKi Nakamichi, Shizuoka (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 16/205,249

(22) Filed: Nov. 30, 2018

(65) Prior Publication Data

US 2019/0100674 A1   Apr. 4, 2019

Related U.S. Application Data

(63) Continuation of application No. PCT/JP2017/022022, filed on Jun. 14, 2017.

(30) Foreign Application Priority Data

Jun. 17, 2016  (JP) .................. 2016-121286
Nov. 15, 2016  (JP) .................. 2016-222756

(51) Int. Cl.
| | | |
|---|---|---|
| C09D 133/02 | (2006.01) | |
| C09D 175/04 | (2006.01) | |
| C09D 183/04 | (2006.01) | |
| C08K 3/36 | (2006.01) | |
| C08K 5/05 | (2006.01) | |
| C08K 5/06 | (2006.01) | |
| C08K 5/07 | (2006.01) | |
| C09D 133/00 | (2006.01) | |
| C09D 183/02 | (2006.01) | |
| C08L 33/06 | (2006.01) | |
| B32B 9/00 | (2006.01) | |
| C09D 5/24 | (2006.01) | |
| C08G 77/02 | (2006.01) | |
| C08K 5/42 | (2006.01) | |

(52) U.S. Cl.
CPC .............. *C09D 133/02* (2013.01); *B32B 9/00* (2013.01); *C08K 3/36* (2013.01); *C08L 33/06* (2013.01); *C09D 5/24* (2013.01); *C09D 133/00* (2013.01); *C09D 175/04* (2013.01); *C09D 183/02* (2013.01); *C08G 77/02* (2013.01); *C08K 5/42* (2013.01)

(58) Field of Classification Search
CPC ............... C08K 3/36; C08K 5/07; C09D 5/16
See application file for complete search history.

(56) References Cited

U.S. PATENT DOCUMENTS

2010/0159256 A1*  6/2010  Yamasaki .......... C08L 101/10
                                                                428/447
2016/0130447 A1    5/2016  Kaneiwa

FOREIGN PATENT DOCUMENTS

| JP | 2010-144009 A | 7/2010 |
|---|---|---|
| JP | 5804996 B2 | 11/2015 |
| WO | 2009/025247 A1 | 2/2009 |
| WO | 2015/012021 A1 | 1/2015 |
| WO | 2015/122395 A1 | 8/2015 |
| WO | 2015/141240 A1 | 9/2015 |
| WO | 2016/056489 A1 | 4/2016 |

OTHER PUBLICATIONS

International Search Report issued in International Application No. PCT/JP2017/022022 dated Jul. 25, 2017.
Written Opinion of the ISA issued in International Application No. PCT/JP2017/022022 dated Jul. 25, 2017.
Extended European Search Report dated Mar. 19, 2019, issued in corresponding EP Patent Application No. 17813369.0.

* cited by examiner

*Primary Examiner* — Vu A Nguyen
(74) *Attorney, Agent, or Firm* — SOLARIS Intellectual Property Group, PLLC

(57) ABSTRACT

Provided are a film-forming composition containing a hydrolysate of a siloxane compound represented by Formula (1), silica particles, a ketone-based solvent, and water, and a manufacturing method of a laminate. In Formula (1), $R^1$, $R^2$, $R^3$, and $R^4$ each independently represent a monovalent organic group having 1 to 6 carbon atoms. n represents an integer of 2 to 20.

Formula (1)

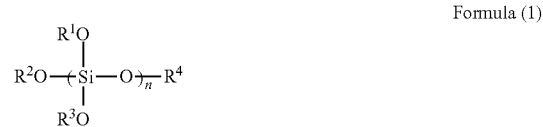

7 Claims, No Drawings

FILM-FORMING COMPOSITION AND MANUFACTURING METHOD OF LAMINATE

CROSS-REFERENCE TO RELATED APPLICATIONS

This application is a continuation application of International Application No. PCT/JP2017/022022, filed Jun. 14, 2017, the disclosure of which is incorporated herein by reference in its entirety. Further, this application claims priority from Japanese Patent Application No. 2016-121286, filed Jun. 17, 2016, and Japanese Patent Application No. 2016-222756, filed Nov. 15, 2016, the disclosures of which are incorporated herein by reference in their entireties.

BACKGROUND OF THE INVENTION

1. Field of the Invention

The present disclosure relates to a film-forming composition and a manufacturing method of a laminate.

2. Description of the Related Art

Devices, building materials, and the like that are installed in indoor spaces or outdoor spaces and used for a long period of time are exposed to various environments. Therefore, due to the gradual accumulation of dirt, dust, or gravel, being wet with rainwater in the rain and wind, and the like, the functions and performances of the devices or the building materials supposed to be demonstrated are impaired in some cases.

For example, in recent years, a monitoring camera has been widely used as a home security device or as a security system for commercial buildings or outdoor spaces. The monitoring camera is a stationary apparatus comprising an imaging device such as a charge coupled device (CCD) camera and a protective cover. Usually, once installed, the monitoring camera is used for a long period of time. The protective cover has light-transmitting properties, which enable imaging, and plays a role of protecting the imaging device from rainwater, gravel, and the like.

It is required for the protective cover of the monitoring camera to be a maintenance-free member which does not need to be cleaned for a long period of time, such that images can be stably captured all the time while the imaging device is being protected. Incidentally, in the case of a device such as the monitoring camera which is used generally by being installed in an outdoor space, water drops, dirt, dust, sand, and the like adhere to the surface of the instrument by the long-term use, and hence the light-transmitting properties tend to be gradually impaired. In the case of the monitoring camera, dirt, dust, sand, and the like are easily accumulated on the surface of the protective cover. Depending on the size or amount of the deposit, the light-transmitting properties may markedly deteriorate, and images could not be recorded as expected.

Under the circumstances, examinations have been carried out regarding techniques for preventing water drops, dirt, dust, sand, and the like from adhering to devices, building materials, and the like exposed to outdoor environments. Examples of the device, building materials, and the like exposed to outdoor environments include, in addition to a monitoring camera, an automobile light, a lighting, a sign, a garage roof, a road noise barrier, and the like.

As a technique relating to the above description, for example, there is a disclosure regarding an aqueous antifouling coating agent containing at least a siloxane binder formed of a compound having a specific structure, an antistatic agent, and silica particles, in which a content rate of components exhibiting surface-activating properties with respect to the total solid content of the coating agent is equal to or higher than 0.5% by mass (see WO2016/056489A). According to the disclosure, by the aqueous antifouling coating agent, it is possible to form a film which is hardly contaminated and from which contaminants can be easily removed in a case where the film is contaminated.

Furthermore, an antifogging and antifouling agent for an organic substrate has been suggested which contains methanol and/or ethanol in an amount of 20 wt % to 80 wt %, isopropyl alcohol, n-propyl alcohol, or glycol ether in an amount of 20 wt % to 80 wt %, an organosilica sol in an amount of 1.0 wt % to 70.0 wt %, tetrahydrofuran in an amount of 0.1 wt % to 3.0 wt %, and boric acid in an amount of 0.02 wt % to 0.4 wt % (see JP5804996B). According to JP5804996B, the antifogging and antifouling agent for an organic substrate forms a hydrophilic inorganic cured coating film on an organic substrate and brings about an antifouling effect by self-cleaning.

SUMMARY OF THE INVENTION

Incidentally, from the viewpoint of allowing the coating agent to last its effect, it is required for the coating agent to be able to form a film having excellent adhesiveness. Furthermore, it is required for the coating agent to be able to form a film having excellent transparency so as to prevent the impairment of the functions and performances of devices, building materials, and the like.

Regarding the points described above, it is hard to say that the film formed using the aqueous antifouling coating agent described in WO2016/056489A exhibits sufficient adhesiveness with respect to a resin substrate, and the coating agent needs to be further ameliorated. The antifogging and antifouling agent described in JP5804996B contains alcohol-based solvents and boric acid such that the adhesiveness with respect to an organic substrate is improved. However, it is hard to say that the adhesiveness is sufficient, and the antifogging and antifouling agent is not focused on the transparency of a film.

An embodiment of the present invention has been made in consideration of the circumstances described above, and an object thereof is to provide a film-forming composition which can form a film having excellent adhesiveness and transparency.

Furthermore, an object of another embodiment of the present invention is to provide a manufacturing method of a laminate in which a substrate and a film exhibit excellent adhesiveness.

Specific means for achieving the aforementioned objects include the following embodiments.

[1] A film-forming composition comprising a hydrolysate of a siloxane compound represented by Formula (1), silica particles, a ketone-based solvent, and water.

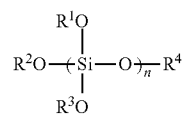

Formula (1)

In Formula (1), $R^1$, $R^2$, $R^3$, and $R^4$ each independently represent a monovalent organic group having 1 to 6 carbon atoms. n represents an integer of 2 to 20.

[2] The film-forming composition described in [1], further comprising at least one kind of solvent selected from the group consisting of an alcohol-based solvent, a glycol ether-based solvent, and an ether-based solvent.

[3] The film-forming composition described in [1] or [2], further comprising at least one kind of resin selected from the group consisting of a urethane-based resin and a (meth)acrylic resin.

[4] The film-forming composition described in [3], in which the (meth)acrylic resin is a polyacrylic acid.

[5] A manufacturing method of a laminate, comprising forming a film by applying the film-forming composition described in any one of [1] to [4] onto a substrate.

[6] The manufacturing method of a laminate described in [5], in which the substrate is a polycarbonate substrate.

According to an embodiment of the present invention, there is provided a film-forming composition which can form a film having excellent adhesiveness and transparency.

Furthermore, according to another embodiment of the present invention, there is provided a manufacturing method of a laminate in which a substrate and a film exhibit excellent adhesiveness.

DESCRIPTION OF THE PREFERRED EMBODIMENTS

Hereinafter, an example of the embodiment of the film-forming composition and the manufacturing method of a laminate to which the present invention is applied will be described. Here, the present invention is not limited to the following embodiment, and can be appropriately modified within the scope of the object of the present invention.

In the present specification, a range of numerical values described using "to" means a range which includes the numerical values listed before and after "to" as a minimum value and a maximum value respectively.

In the present specification, regarding ranges of numerical values that are gradationally described, the upper limit or the lower limit described in one range of numerical values may be substituted with the upper limit or the lower limit of another range of numerical values that is gradationally described. Furthermore, the upper limit or the lower limit of a range of numerical values described in the present specification may be substituted with the values shown in examples.

In the present specification, in a case where the amount of each of the components in the film-forming composition is mentioned, provided that the film-forming composition contains a plurality of substances corresponding to each of the components, unless otherwise specified, the amount of each of the components means the total amount of the plurality of substances present in the film-forming composition.

In the present specification, "solvent" means water, an organic solvent, and a mixed solvent of water and an organic solvent.

In the present specification, the term "solid contents" means the components except for a solvent. A liquid component such as a low-molecular weight component other than a solvent is also included in "solid contents" in the present specification.

In the present specification, "(meth)acryl" is a concept including both the acryl and methacryl.

[Film-Forming Composition]

The film-forming composition of the present embodiment is a film-forming composition containing a hydrolysate of a siloxane compound represented by Formula (1) (hereinafter, referred to as "specific siloxane compound" as well), silica particles, a ketone-based solvent, and water.

The film-forming composition of the present embodiment contains the hydrolysate of the specific siloxane compound, the silica particles, and water in combination with the ketone-based solvent. Therefore, the film-forming composition can form a film having excellent transparency and adhesiveness.

The aqueous antifouling coating agent described in WO2016/056489A contains the hydrolysate of the specific siloxane compound, the silica particles, and water just like the film-forming composition of the present embodiment. However, the aqueous antifouling coating agent contains an alcohol-based solvent as a solvent and does not contain the ketone-based solvent. As a result of conducting an examination, the inventors of the present invention confirmed that with a film-forming composition which contains an alcohol-based solvent as a solvent but does not contain a ketone-based solvent, a film having excellent adhesiveness cannot be formed.

In the antifogging and antifouling agent described in JP5804996B, an organosilica sol, an alcohol-based solvent, and boric acid are combined such that the adhesiveness of the formed film is improved. JP5804996B is not focused on the selection of a ketone-based solvent for improving the adhesiveness of the film. Furthermore, JP5804996B is not focused on the transparency of the film.

The film-forming composition of the present embodiment contains the hydrolysate of the specific siloxane compound and the silica particles. Therefore, the composition can form a film having excellent hydrophilicity. In the film having excellent hydrophilicity, a contact angle of water adhering to the film surface is small. Accordingly, the film is inhibited from being fogged by the adhesion of tiny water drops to the film surface. That is, the film-forming composition of the present embodiment can form a film having excellent antifogging properties.

<Hydrolysate of Specific Siloxane Compound>

The film-forming composition of the present embodiment contains a hydrolysate of a siloxane compound represented by Formula (1) (that is, the specific siloxane compound).

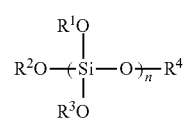

Formula (1)

In Formula (1), $R^1$, $R^2$, $R^3$, and $R^4$ each independently represent a monovalent organic group having 1 to 6 carbon atoms. n represents an integer of 2 to 20.

The organic group having 1 to 6 carbon atoms represented by $R^1$, $R^2$, $R^3$, and $R^4$ may be linear, branched, or cyclic.

Examples of the monovalent organic group include an alkyl group, an alkenyl group, and the like. The monovalent organic group is preferably an alkyl group.

In a case where $R^1$, $R^2$, $R^3$, and $R^4$ represent an alkyl group, examples of the alkyl group include a methyl group, an ethyl group, a propyl group, an isopropyl group, a n-butyl group, a tert-butyl group, a n-pentyl group, a n-hexyl group, a cyclohexyl group, and the like.

In a case where $R^1$, $R^2$, $R^3$, and $R^4$ represent a monovalent organic group (preferably an alkyl group) having 1 to 6 carbon atoms, the hydrolyzability of the specific siloxane compound is improved. In view of further improving the hydrolyzability of the specific siloxane compound, $R^1$, $R^2$, $R^3$, and $R^4$ more preferably each independently represent an alkyl group having 1 to 4 carbon atoms, and even more preferably each independently represent an alkyl group having 1 or 2 carbon atoms.

In Formula (1), n represents an integer of 2 to 20. In a case where n is equal to or greater than 2, the reactivity of the specific siloxane compound can be easily controlled, and for example, a film having excellent surface hydrophilicity can be formed. In a case where n is equal to or smaller than 20, the viscosity of the film-forming composition does not become too high, and the handleability and the uniform coating properties are improved. n is preferably 3 to 12, and more preferably 5 to 10.

In Table 1, examples of the specific siloxane compound are described by using $R^1$, $R^2$, $R^3$, $R^4$, and n in Formula (1). Here, the specific siloxane compound in the present embodiment is not limited to the example compounds described in Table 1.

TABLE 1

| Specific siloxane compound | $R^1$ | $R^2$ | $R^3$ | $R^4$ | n |
| --- | --- | --- | --- | --- | --- |
| Compound 1 | Methyl group | Methyl group | Methyl group | Methyl group | 5 |
| Compound 2 | Methyl group | Methyl group | Methyl group | Methyl group | 10 |
| Compound 3 | Ethyl group | Ethyl group | Ethyl group | Ethyl group | 5 |
| Compound 4 | Ethyl group | Ethyl group | Ethyl group | Ethyl group | 10 |

The film-forming composition of the present embodiment contains a hydrolysate of the aforementioned specific siloxane compound.

In a case where the specific siloxane compound coexists with water, at least a portion of the compound is hydrolyzed. By the reaction between the specific siloxane compound and water, at least some of $OR^1$, $OR^2$, $OR^3$, and $OR^4$ bonded to silicon atoms of the specific siloxane compound are substituted with a hydroxy group, and as a result, the hydrolysate of the specific siloxane compound is formed. Presumably, due to the hydroxy group, which is a hydrophilic group, contained in the hydrolysate of the specific siloxane compound, the film obtained from the film-forming composition containing the hydrolysate of the specific siloxane compound may have excellent surface hydrophilicity.

At the time of hydrolysis reaction, not all the terminal groups (that is, $—OR^1$, $—OR^2$, $—OR^3$, or $—OR^4$) of the specific siloxane compound need to react. However, from the viewpoint of further improving the hydrophilicity of the film obtained by coating and drying of the film-forming composition, it is preferable that more terminal groups are hydrolyzed.

As the specific siloxane compound, commercial products can be used.

Examples of the commercial products of the specific siloxane compound include MKC (registered trademark) SILICATE MS51 [$R^1$, $R^2$, $R^3$, and $R^4$: methyl group, average of n: 5], MKC (registered trademark) SILICATE MS56 [$R^1$, $R^2$, $R^3$, and $R^4$: methyl group, average of n: 11], MKC (registered trademark) SILICATE MS57 [$R^1$, $R^2$, $R^3$, and $R^4$: methyl group, average of n: 13], MKC (registered trademark) SILICATE MS56S [$R^1$, $R^2$, $R^3$, and $R^4$: methyl group, average of n: 16], MKC (registered trademark) METHYL SILICATE 53A [$R^1$, $R^2$, $R^3$, and $R^4$: methyl group, average of n: 7], MKC (registered trademark) ETHYL SILICATE 40 [$R^1$, $R^2$, $R^3$, and $R^4$: ethyl group, average of n: 5], MKC (registered trademark) ETHYL SILICATE 48 [$R^1$, $R^2$, $R^3$, and $R^4$: ethyl group, average of n: 10], MKC (registered trademark) EMS485 [$R^1$, $R^2$, $R^3$, and $R^4$: methyl group (50%) and ethyl group (50%), average of n: 10] from Mitsubishi Chemical Corporation, and the like.

The film-forming composition of the present embodiment may contain only one kind of hydrolysate of the specific siloxane compound or two or more kinds of hydrolysates of the specific siloxane compound.

In the film-forming composition of the present embodiment, a content rate of the hydrolysate of the specific siloxane compound with respect to the total solid content of the film-forming composition is preferably equal to or higher than 1% by mass, more preferably equal to or higher than 5% by mass, and even more preferably equal to or higher than 10% by mass.

In the film-forming composition of the present embodiment, the content rate of the hydrolysate of the specific siloxane compound with respect to the total solid content of the film-forming composition is preferably equal to or lower than 80% by mass, more preferably equal to or lower than 60% by mass, and even more preferably equal to or lower than 40% by mass.

In a case where the content rate of the hydrolysate of the specific siloxane compound with respect to the total solid content of the film-forming composition is equal to or higher than 1% by mass, a film exhibiting excellent adhesiveness with respect to a substrate and having excellent antifouling properties can be formed. In a case where the content rate of the hydrolysate of the specific siloxane compound with respect to the total solid content of the film-forming composition is equal to or higher than 1% by mass and equal to or lower than 80% by mass, the water contact angle on the surface is reduced. Therefore, it is possible to form a film which has excellent antifouling properties and self-cleaning properties by which contaminants easily removed in a case where the film is contaminated.

<Silica Particles>

The film-forming composition of the present embodiment contains silica particles.

In the film-forming composition of the present embodiment, the silica particles contribute to the improvement of physical resistance and hydrophilicity of the formed film. That is, the silica particles function as a hard filler in the formed film and can improve the hydrophilicity of the formed film by the action of a hydroxy group on the surface of the particles.

Examples of the silica particles include fumed silica, colloidal silica, and the like.

The fumed silica can be obtained by reacting a compound containing a silicon atom with oxygen and hydrogen in a gas phase. Examples of the silicon compound as a raw material include silicon halide (for example, silicon chloride) and the like.

The colloidal silica can be synthesized by a sol-gel method in which a raw material compound is hydrolyzed and condensed. Examples of the raw material compound of the colloidal silica include alkoxy silicon (for example, tetraethoxysilane), a halogenated silane compound (for example, diphenyldichlorosilane), and the like.

The shape of the silica particles is not particularly limited, and examples thereof include a spherical shape, a plate shape, a needle shape, a bead shape, and the like. "Spherical shape" mentioned herein includes a perfect sphere shape, a spheroidal shape, an oval shape, and the like.

The size of the silica particles is not particularly limited. For example, from the viewpoint of further improving the transparency of the film formed using the film-forming composition, an average primary particle diameter of the silica particles is preferably equal to or greater than 1 nm and equal to or smaller than 100 nm, more preferably equal to or greater than 4 nm and equal to or smaller than 80 nm, and even more preferably equal to or greater than 8 nm and equal to or smaller than 50 nm.

In a case where the silica particles have a spherical shape or have an approximately spherical shape which has an elliptical cross section, for determining the average primary particle diameter of the silica particles, the dispersed silica particles are observed using a transmission electron microscope, a projected area is measured for 300 or more silica particles in the obtained photograph, and an equivalent circle diameter is obtained from the projected area. The obtained equivalent circle diameter is adopted as the average primary particle diameter of the silica particles. In a case where the silica particles do not have a spherical shape or an approximately spherical shape, the average primary particle diameter of the silica particles is determined using another method, for example, a dynamic light scattering method.

As the silica particles, commercial products can be used.

Examples of the commercial products of the silica particles include a SNOWTEX (registered trademark) series from NISSAN CHEMICAL INDUSTRIES, LTD. [for example, SNOWTEX (registered trademark) OUP], an AEROSIL (registered trademark) series from Evonik Industries AG, a Nalco (registered trademark) series from Nalco Chemical Company [for example, Nalco (registered trademark) 8699], a QUARTRON PL series from FUSO CHEMICAL CO., LTD. (for example, PL-1), and the like.

The film-forming composition of the present embodiment contains only one kind of silica particles or two or more kinds of silica particles. In a case where the film-forming composition of the present embodiment contains two or more kinds of silica particles, silica particles which differ from each other in terms of the shape, the average primary particle diameter, and the like may be used in combination.

In the film-forming composition of the present embodiment, a content rate of the silica particles with respect to the total solid content of the film-forming composition is preferably equal to or higher than 10% by mass and equal to or lower than 90% by mass, more preferably equal to or higher than 20% by mass and equal to or lower than 70% by mass, and even more preferably equal to or higher than 30% by mass and equal to or lower than 50% by mass.

In a case where the content rate of the silica particles in the film-forming composition is within the above range, it is possible to form a film which has further improved hardness, scratch resistance, and impact resistance and has desired hydrophilicity.

<Ketone-Based Solvent>

The film-forming composition of the present embodiment contains a ketone-based solvent.

In the film-forming composition of the present embodiment, the ketone-based solvent contributes to the adhesiveness with respect to a substrate.

The ketone-based solvent is not particularly limited, and examples thereof include acetone, diacetone alcohol, acetyl acetone, methyl ethyl ketone, methyl isobutyl ketone, diisobutyl ketone, cyclohexanone, cyclopentanone, and the like.

From the viewpoint of making it possible to form a film having further improved transparency, the ketone-based solvent is preferably a ketone-based solvent having an SP value (solubility parameter) equal to or greater than $10.0$ $MPa^{1/2}$. The upper limit of the SP value of the ketone-based solvent is not particularly limited. From the viewpoint of coating properties with respect to a substrate (for example, from the viewpoint of making it difficult for planar failure such as cissing to occur), the upper limit of the SP value is preferably equal to or smaller than $13.0$ $MPa^{1/2}$.

Specific examples of the ketone-based solvent having an SP value equal to or greater than $10.0$ $MPa^{1/2}$ will be shown below. Here, the present embodiment is not limited to the following specific examples. The number in the parenthesis after each of the following specific examples represents an SP value (unit: $MPa^{1/2}$).

Acetone (10.0), diacetone alcohol (10.2), acetyl acetone (10.3), cyclopentanone (10.4)

The SP value is a value which is represented by the square root of molecular cohesive energy and calculated by the method described in R. F. Fedors, Polymer Engineering Science, 14, p. 147 to p. 154 (1974).

The film-forming composition of the present embodiment may contain only one kind of ketone-based solvent or two or more kinds of ketone-based solvents.

In the film-forming composition of the present embodiment, a content rate of the ketone-based solvent is preferably equal to or higher than 1% by mass and equal to or lower than 95% by mass. The content rate of the ketone-based solvent in the film-forming composition can be appropriately set according to the type of a substrate to which the film-forming composition is applied, the solubility of materials contained in the film-forming composition, and the like.

For example, in a case where the film-forming composition is applied to a polycarbonate substrate, the content rate of the ketone-based solvent with respect to the total mass of solvents contained in the film-forming composition is preferably equal to or higher than 3% by mass and equal to or lower than 95% by mass, more preferably equal to or higher than 5% by mass and equal to or lower than 95% by mass, even more preferably equal to or higher than 10% by mass and equal to or lower than 60% by mass, and particularly preferably equal to or higher than 20% by mass and equal to or lower than 50% by mass. In a case where the film-forming composition is applied to a polymethyl methacrylate substrate, the content rate of the ketone-based solvent with respect to the total mass of solvents contained in the film-forming composition is preferably equal to or higher than 1% by mass and equal to or lower than 20% by mass, more preferably equal to or higher than 1% by mass and equal to or lower than 10% by mass, and even more preferably equal to or higher than 3% by mass and equal to or lower than 7% by mass.

In a case where the content rate of the ketone-based solvent in the film-forming composition is within the above range, a film having further improved transparency and adhesiveness can be formed.

<Water>

The film-forming composition of the present embodiment contains water.

In the film-forming composition of the present embodiment, a content rate of water is not particularly limited and can be appropriately set.

For example, in a case where a thin film is formed using the film-forming composition of the present embodiment, the content rate of water with respect to the total mass of solvents contained in the film-forming composition can be equal to or higher than 1% by mass and equal to or lower than 20% by mass. The content rate of water is preferably equal to or higher than 5% by mass and equal to or lower than 15% by mass, and more preferably equal to or higher than 6% by mass and equal to or lower than 12% by mass. Furthermore, for example, in a case where a thick film is formed, the content rate of water with respect to the total mass of solvents contained in the film-forming composition can be equal to or higher than 1% by mass and equal to or lower than 70% by mass. The content rate of water is preferably equal to or higher than 5% by mass and equal to or lower than 60% by mass, and more preferably equal to or higher than 6% by mass and equal to or lower than 50% by mass.

In the present embodiment, a thin film refers to a film having a thickness equal to or smaller than 1 μm, and a thick film refers to a film having a thickness greater than 1 μm.

<Specific Solvent>

It is preferable that the film-forming composition of the present embodiment contains at least one kind of solvent (hereinafter, referred to as "specific solvent" as well) selected from the group consisting of an alcohol-based solvent, a glycol ether-based solvent, and an ether-based solvent.

In a case where the film-forming composition of the present embodiment further contains the specific solvent in addition to the aforementioned ketone-based solvent, a film having further improved adhesiveness can be formed.

In the present specification, "alcohol-based solvent" refers to a solvent having a structure in which one carbon atom of hydrocarbon is substituted with one hydroxy group.

In the present specification, "glycol ether-based solvent" refers to a solvent having a structure containing one hydroxy group and at least one ether group in one molecule.

In the present specification, "ether-based solvent" refers to a solvent having a structure containing at least one ether group in one molecule without a hydroxy group.

Examples of the alcohol-based solvent include methanol, ethanol, butanol, n-propanol, 2-propanol, tert-butanol, 2-butanol, benzyl alcohol, 2-methyl-1-butanol, 2-methyl-2-butanol, and the like.

Examples of the glycol ether-based solvent include diethylene glycol monomethyl ether, diethylene glycol monoethyl ether, diethylene glycol monobutyl ether, triethylene glycol monomethyl ether, propylene glycol monomethyl ether, propylene glycol monobutyl ether, 3-methoxy-3-methyl-1-butanol, diethylene glycol monohexyl ether, propylene glycol monomethyl ether propionate, dipropylene glycol methyl ether, methyl cellosolve, ethyl cellosolve, butyl cellosolve, and the like.

Examples of the ether-based solvent include isopropyl ether, 1,4-dioxane, tert-butylmethylether, tetrahydrofuran, 2-methyltetrahydrofuran, 1,2-dimethoxyethane, diethyl ether, and the like.

In a case where the film-forming composition of the present embodiment further contains the specific solvent, the film-forming composition may contain only one kind of specific solvent or two or more kinds of specific solvents.

In a case where the film-forming composition of the present embodiment further contains the specific solvent, a content rate of the specific solvent in the film-forming composition is not particularly limited.

From the viewpoint of coating properties with respect to a substrate (for example, from the viewpoint of making it difficult for planar failure such as cissing to occur), the content rate of the specific solvent in the film-forming composition of the present embodiment with respect to the total mass of solvents contained in the film-forming composition is preferably equal to or higher than 5% by mass, more preferably equal to or higher than 10% by mass, even more preferably equal to or higher than 20% by mass, and particularly preferably equal to or higher than 40% by mass.

Furthermore, from the viewpoint of adhesiveness with respect to a substrate, the content rate of the specific solvent in the film-forming composition of the present embodiment with respect to the total mass of solvents contained in the film-forming composition is preferably equal to or lower than 75% by mass, more preferably equal to or lower than 65% by mass, and even more preferably equal to or lower than 55% by mass.

In a case where the film-forming composition of the present embodiment further contains the specific solvent, from the viewpoint of coating properties with respect to a substrate and adhesiveness with respect to a substrate, a ratio of the content of the specific solvent (that is, the total content of an alcohol-based solvent, a glycol ether-based solvent, and an ether-based solvent) to the content of the ketone-based solvent in the film-forming composition is preferably 0.1 to 51.4 based on mass. The ratio of the content of the specific solvent to the content of the ketone-based solvent in the film-forming composition can be appropriately set according to the type of a substrate to which the film-forming composition is applied, the solubility of materials contained in the film-forming composition, and the like.

For example, in a case where the film-forming composition is applied to a polycarbonate substrate, the aforementioned ratio is preferably 0.1 to 16.5, more preferably 0.1 to 7.1, even more preferably 0.3 to 5.5, and particularly preferably 1.0 to 3.1. Furthermore, for example, in a case where the film-forming composition is applied to a polymethyl methacrylate substrate, the aforementioned ratio is preferably 1.0 to 51.4, more preferably 1.0 to 16.5, even more preferably 4.2 to 16.5, and particularly preferably 7.6 to 16.5.

From the viewpoint of excellently maintaining the stability of the film-forming composition over time, a total content rate of solvents in the film-forming composition of the present embodiment with respect to the total mass of the film-forming composition is preferably equal to or higher than 50% by mass, more preferably equal to or higher than 70% by mass, even more preferably equal to or higher than 90% by mass, and particularly preferably equal to or higher than 95% by mass.

<Other Components>

If necessary, the film-forming composition of the present embodiment may contain components other than the components described above. Examples of those other components include an adhesion aid which contributes to the improvement of adhesiveness with respect to a substrate, a viscosity adjuster for adjusting the viscosity of the film-forming composition, a catalyst for accelerating a condensation reaction of the hydrolysate of the specific siloxane compound (hereinafter, referred to as "condensation-accelerating catalyst" as well), an antistatic agent, a surfactant, and the like.

<Adhesion Aid>

The film-forming composition of the present embodiment may further contain an adhesion aid.

In the film-forming composition of the present embodiment, the adhesion aid contributes to the improvement of the adhesiveness of a film, which is formed of the film-forming composition, with respect to a substrate (particularly, a polycarbonate substrate).

Examples of the adhesion aid include a film-forming component which does not have a siloxane structure in a molecule, for example, a polymer compound which can form a film. More specifically, examples thereof include compounds having a polar group (a hydroxyl group, a carboxy group, a phosphoric acid group, a sulfonic acid group, an amino group, or the like) on a terminal, such as a urethane-based resin, a (meth)acrylic resin, polyphosphate, and metaphosphate.

Among these, as the adhesion aid, from the viewpoint of further improving the adhesiveness of the film, which is formed of the film-forming composition, with respect to a substrate, a compound having at least one kind of functional group selected from the group consisting of a hydroxyl group, a carboxy group, and a phosphoric acid group on a terminal is preferable, at least one kind of compound selected from the group consisting of a urethane-based resin, a (meth)acrylic resin, and polyphosphate is more preferable, and at least one kind of resin selected from the group consisting of a urethane-based resin and a (meth)acrylic resin is even more preferable.

The urethane-based resin is not particularly limited, and examples thereof include polyurethane having a soft segment/hard segment structure formed of a polyol skeleton and a polyisocyanate skeleton, and the like.

As the urethane-based resin, commercial products can be used.

Examples of the commercial products of the urethane-based resin include TAKELAC (registered trademark) W series, WS series, and WD series from Mitsui Chemicals, Inc., a PERMARIN (registered trademark) series, a UCOAT (registered trademark) series, and a UPRENE (registered trademark) series from Sanyo Chemical Industries, Ltd., and the like.

In the present specification, "(meth)acrylic resin" refers to a polymer containing at least one kind of constitutional unit selected from the group consisting of a constitutional unit derived from an acrylic acid, a constitutional unit derived from a methacrylic acid, a constitutional unit derived from an acrylic acid ester, and a constitutional unit derived from a methacrylic acid ester.

Examples of the (meth)acrylic resin include a homopolymer of an acrylic acid (that is, a polyacrylic acid), a homopolymer of a methacrylic acid (that is, a polymethacrylic acid), a copolymer containing at least one kind of monomer selected from the group consisting of an acrylic acid, a methacrylic acid, an acrylic acid ester, and a methacrylic acid ester, and the like.

Among these, as the (meth)acrylic resin, a polyacrylic acid is preferable. The weight-average molecular weight of the polyacrylic acid is preferably equal to or greater than 25,000 and equal to or smaller than 5,000,000, more preferably equal to or greater than 50,000 and equal to or smaller than 2,000,000, and even more preferably equal to or greater than 150,000 and equal to or smaller than 1,000,000.

The weight-average molecular weight of the polyacrylic acid can be measured by gel permeation chromatography (GPC).

The measurement by gel permeation chromatography (GPC) can be performed using HLC-8120GPC and SC-8020 (all manufactured by Tosoh Corporation) as measurement apparatuses, two pieces of TSKgel (registered trademark) Super HM-H (6.0 mmID×15 cm, Tosoh Corporation) as columns, and tetrahydrofuran (THF) as an eluent. Furthermore, the measurement can be performed under the condition of a sample concentration of 0.5% by mass, a flow rate of 0.6 ml/min, a sample injection amount of 10 µl, and a measurement temperature of 40° C. by using a refractive index (RI) detector.

As a calibration curve, it is possible to use a curve prepared from ten samples of "Standard sample TSK standard, polystyrene" from Tosoh Corporation: "A-500", "F-1", "F-10", "F-80", "F-380", "A-2500", "F-4", "F-40", "F-128", and "F-700".

Examples of the polyphosphate include sodium polyphosphate, potassium polyphosphate, and the like.

In a case where the film-forming composition of the present embodiment further contains the adhesion aid, the film-forming composition may contain only one kind of adhesion aid or two or more kinds of adhesion aids.

In a case where the film-forming composition of the present embodiment further contains the adhesion aid, a content rate of the adhesion rate with respect to the total solid content of the film-forming composition is preferably equal to or higher than 0.001% by mass and equal to or lower than 5% by mass, more preferably equal to or higher than 0.01% by mass and equal to or lower than 1% by mass, and even more preferably equal to or higher than 0.05% by mass and equal to or lower than 0.5% by mass.

In a case where the content rate of the adhesion aid in the film-forming composition is within the above range, a film exhibiting excellent adhesiveness with respect to a substrate is easily formed.

<Viscosity Adjuster>

The film-forming composition of the present embodiment may further contain a viscosity adjuster.

In a case where the film-forming composition of the present embodiment contains the viscosity adjuster, the viscosity of the film-forming composition is increased, liquid dripping hardly occurs at the time of coating, and coating suitability is improved.

The viscosity adjuster is not particularly limited, and examples thereof include a known thickener, a solvent with high viscosity, and the like. The viscosity adjuster can be appropriately selected according to the method for applying the film-forming composition to a substrate.

The thickener is not particularly limited, and is preferably appropriately selected according to the type of the solvent contained in the film-forming composition. As the thickener, from the viewpoint of obtaining thickening effect by using a relatively small amount of the thickener, a thickener having a weight-average molecular weight equal to or greater than 3,000 and equal to or smaller than 10,000,000 is preferable.

The urethane-based resin and the (meth)acrylic resin described above are not included in the thickener mentioned herein.

The weight-average molecular weight of the thickener can be measured by the same method as that used for measuring the weight-average molecular weight of the polyacrylic acid described above.

Specifically, examples of the thickener include SEPIGEL 305 manufactured by SEIWA KASEI Co., Ltd., DISPER-BYK (registered trademark) 410, 411, 415, 420, 425, 428, 430, 431, 7410ET, 7411ES, and 7420ES manufactured by BYK-Chemie GmbH, COSQUAT GA468 manufactured by OSAKA ORGANIC CHEMICAL INDUSTRY LTD, inorganic materials [silicate (water-soluble alkaline silicate), montmorillonite, organic montmorillonite, colloidal alumina, and the like], fiber derivative-based materials (carboxymethyl cellulose, methyl cellulose, ethyl cellulose, hydroxymethyl cellulose, hydroxyethyl cellulose, hydroxypropyl cellulose, hydroxyethyl methyl cellulose, hydroxypropyl methyl cellulose, and the like), protein-based materials (casein, sodium caseinate, ammonium caseinate, and the like), alginic acid-based materials (sodium alginate and the like), polyvinyl-based materials (polyvinyl alcohol, polyvinyl pyrrolidone, a polyvinyl benzyl ether copolymer, and the like), polyether-based materials (Pluronic polyether, a polyether dialkyl ester, a polyether dialkyl ether, a polyether urethane-modified substance, a polyether epoxy-modified substance, and the like), maleic acid anhydride copolymer-based materials (a partial ester of a vinyl ether-maleic acid anhydride copolymer and a half ester of drying oil fatty acid allyl alcohol ester-maleic acid anhydride), and the like. Examples of the thickener include a salt of polyamide wax, acetylene glycol, xanthan gum, an oligomer or polymer having a polar group on a terminal or side chain of a molecule, and the like, in addition to the above thickeners.

In a case where the film-forming composition of the present embodiment further contains the thickener as a viscosity adjuster, the film-forming composition may contain only one kind of thickener or two or more kinds of thickeners.

In a case where the film-forming composition of the present embodiment contains the thickener as a viscosity adjuster, a content rate of the thickener in the film-forming composition with respect to the total mass of the film-forming composition is preferably equal to or higher than 0.01% by mass and equal to or lower than 40% by mass, more preferably equal to or higher than 0.1% by mass and equal to or lower than 20% by mass, and even more preferably equal to or higher than 0.5% by mass and equal to or lower than 10% by mass.

As the viscosity adjuster, a solvent with high viscosity is preferable because such a viscosity adjuster component does not remain in the formed film.

In the present specification, "solvent with high viscosity" refers to a solvent having viscosity equal to or higher than 30 mPa/s at 25° C.

The viscosity in the present specification is a value measured using a type B viscometer (model type: TVB-10) manufactured by TOKI SANGYO CO., LTD.

Examples of the solvent with high viscosity include a glycol-based solvent.

In the present specification, "glycol-based solvent" refers to a solvent having a structure in which each of two or more carbon atoms of hydrocarbon is substituted with a hydroxy group.

Examples of the glycol-based solvent include ethylene glycol, diethylene glycol, triethylene glycol, glycerin, propylene glycol, dipropylene glycol, tripropylene glycol, 1,3-propanediol, 1,2-butanediol, 1,3-butanediol, 1,4-butanediol, diethanolamine, triethanolamine, and the like.

Among these, as the glycol-based solvent, from the viewpoint of dispersibility of the silica particles and drying properties at the time of coating, at least one kind of solvent selected from propylene glycol or dipropylene glycol is preferable.

In a case where the film-forming composition of the present embodiment further contains the glycol-based solvent as a viscosity adjuster, the film-forming composition may contain only one kind of glycol-based solvent or two or more kinds of glycol-based solvents.

In a case where the film-forming composition of the present embodiment contains the glycol-based solvent as a viscosity adjuster, a content rate of the glycol-based solvent in the film-forming composition with respect to the total mass of solvents contained in the film-forming composition is preferably equal to or lower than 40% by mass, more preferably equal to or lower than 20% by mass, even more preferably equal to or lower than 10% by mass, and particularly preferably equal to or lower than 5% by mass.

In a case where the content rate of the glycol-based solvent with respect to the total mass of solvents contained in the film-forming composition is equal to or lower than 40% by mass, it is possible to form a film having excellent adhesiveness while inhibiting the dripping of the film-forming composition at the time of coating.

From the viewpoint of effectively improving the coating suitability by the addition of the glycol-based solvent, the content rate of the glycol-based solvent in the film-forming composition with respect to the total mass of solvents contained in the film-forming composition is preferably equal to or higher than 0.1% by mass.

In a case where the film-forming composition of the present embodiment further contains the viscosity adjuster, the viscosity may be adjusted by using the thickener and the solvent with high viscosity in combination. The optimal viscosity of the film-forming composition of the present embodiment varies with the method for coating a substrate with the composition. For example, in a case where spray coating is used, the viscosity of the film-forming composition is preferably equal to or higher than 2 mPa/s and equal to or lower than 200 mPa/s, more preferably equal to or higher than 3 mPa/s and equal to or lower than 100 mPa/s, and even more preferably equal to or higher than 4 mPa/s and equal to or lower than 50 mPa/s.

(Condensation-Accelerating Catalyst)

It is preferable that the film-forming composition of the present embodiment contains a catalyst accelerating a condensation reaction (that is, a condensation-accelerating catalyst) of the hydrolysate of the specific siloxane compound.

In a case where the film-forming composition of the present embodiment contains the condensation-accelerating catalyst, a film having further improved durability can be formed. In the present embodiment, the film-forming composition is applied onto a substrate, and then the applied film-forming composition is dried such that the amount of moisture is reduced. In addition, at least some of hydroxy groups contained in the hydrolysate of the specific siloxane compound in the film-forming composition are condensed with each other. As a result, a condensate is formed, and hence a stable film is formed. Furthermore, in a case where the film-forming composition of the present embodiment contains the condensation-accelerating catalyst, a film can be more rapidly formed.

The condensation-accelerating catalyst is not particularly limited, and examples thereof include catalysts such as an acid catalyst, an alkali catalyst, and an organic metal catalyst.

Examples of the acid catalyst include nitric acid, hydrochloric acid, sulfuric acid, acetic acid, phosphoric acid, chloroacetic acid, formic acid, oxalic acid, toluenesulfonic acid, xylenesulfonic acid, cumenesulfonic acid, dinonylnaphthalene monosulfonic acid, dinonylnaphthalene disulfonic acid, dodecylbenzene sulfonic acid, polyphosphate, metaphosphate, and the like.

Among these, as the acid catalyst, at least one kind of catalyst selected from the group consisting of phosphoric acid, toluenesulfonic acid, polyphosphate, and metaphosphate is preferable.

Examples of the alkali catalyst include sodium hydroxide, potassium hydroxide, tetramethylammonium hydroxide, sodium hydrogen carbonate, urea, and the like.

Among these, as the alkali catalyst, at least one kind of catalyst selected from sodium bicarbonate or urea is preferable.

Examples of the organic metal catalyst include an aluminum chelate compound such as aluminum bis(ethylacetoacetate)mono(acetylacetonate), aluminum tris(acetylacetonate), or aluminum ethyl acetoacetate diisopropylate; a zirconium chelate compound such as zirconium tetrakis(acetylacetonate) or zirconium bis(butoxy)bis(acetylacetonate); a titanium chelate compound such as titanium tetrakis(acetylacetonate) or titanium bis(butoxy)bis(acetylacetonate); an organic tin compound such as dibutyltin diacetate, dibutyltin dilaurate, or dibutyltin dioctoate, an aluminum alkoxide such as aluminum ethylate, aluminum isopropylate, or aluminum sec-butylate; a titanium alkoxide such as titanium (IV) ethoxide, titanium isopropoxide, or titanium (IV) n-butoxide; a zirconium alkoxide such as zirconium (IV) ethoxide, zirconium (IV) n-propoxide, or zirconium (IV) n-butoxide, and the like.

Among these, as the organic metal catalyst, at least one kind of compound selected from the group consisting of an aluminum chelate compound, a titanium chelate compound, and a zirconium chelate compound is preferable.

Among these, as the condensation-accelerating catalyst, the organic metal catalyst is more preferable, and the aluminum chelate compound is even more preferable.

In a case where the film-forming composition of the present embodiment contains the condensation-accelerating catalyst, the film-forming composition may contain only one kind of condensation-accelerating catalyst or two or more kinds of condensation-accelerating catalysts.

In a case where the film-forming composition of the present embodiment contains the condensation-accelerating catalyst, a content rate of the condensation-accelerating catalyst in the film-forming composition with respect to the total solid content of the film-forming composition is preferably equal to or higher than 0.1% by mass and equal to or lower than 40% by mass, more preferably equal to or higher than 0.2% by mass and equal to or lower than 30% by mass, and even more preferably equal to or higher than 0.3% by mass and equal to or lower than 20% by mass.

In a case where the content rate of the condensation-accelerating catalyst in the film-forming composition is within the above range, a film having excellent transparency can be more rapidly formed.

(Antistatic Agent)

It is preferable that the film-forming composition of the present embodiment contains an antistatic agent.

In the film-forming composition of the present embodiment, the antistatic agent is used for the purpose of inhibiting the adhesion of contaminants by imparting antistatic properties to the film formed using the film-forming composition.

The antistatic agent is not particularly limited, and can be appropriately selected from compounds having an antistatic function. The antistatic agent may be any of a compound which exhibits surface-activating properties and a compound which does not exhibit surface-activating properties. Examples of the antistatic agent include an ionic surfactant, metal oxide particles, and the like.

The aforementioned silica particles are not included in the metal oxide particles mentioned herein.

The ionic surfactant has a property of being precipitated mainly in the vicinity of the film surface, for example, in a case where the film is formed by coating. Therefore, the ionic surfactant is expected to bring about the effect even being used in a small amount. In order to impart antistatic properties to the film, the metal oxide particles need to be used in a relatively large amount in some cases. However, because the metal oxide particles are inorganic substances, they are suitable for improving the scratch resistance of the film.

Examples of the ionic surfactant include an anionic surfactant such as alkyl sulfate [sodium dodecyl sulfate, sodium lauryl sulfate, or the like], alkyl benzene sulfonate [sodium dodecyl benzene sulfonate, sodium lauryl benzene sulfonate, or the like], or alkyl sulfosuccinate [sodium di(2-ethylhexyl)sulfosuccinate or the like]; and a cationic surfactant such as an alkyl trimethyl ammonium salt or a dialkyl dimethyl ammonium salt.

Examples of the metal oxide particles include tin oxide particles, antimony-doped tin oxide particles, tin-doped indium oxide particles, zinc oxide particles, and the like.

The shape of the metal oxide particles is not particularly limited, and may be a spherical shape, a plate shape, or a needle shape.

The higher the refractive index of the metal oxide particles is, and the larger the particle diameter of the metal oxide particles is, the easier it is for the loss of transmitted light to occur due to excessive scattering. Therefore, an average primary particle diameter of the metal oxide particles is preferably equal to or smaller than 100 nm, more preferably equal to or smaller than 50 nm, and even more preferably equal to or smaller than 30 nm.

In a case where the metal oxide particles have a spherical shape or have an approximately spherical shape which has an elliptical cross section, for determining the average primary particle diameter of the metal oxide particles, the dispersed metal oxide particles are observed using a transmission electron microscope, a projected area is measured for 300 or more metal oxide particles in the obtained photograph, and an equivalent circle diameter is obtained from the projected area. The obtained equivalent circle diameter is adopted as the average primary particle diameter of the metal oxide particles. In a case where the metal oxide particles do not have a spherical shape or an approximately spherical shape, the average primary particle diameter of the metal oxide particles is determined using another method, for example, a dynamic light scattering method.

In a case where the film-forming composition of the present embodiment contains the antistatic agent, the film-forming composition may contain only one kind of antistatic agent or two or more kinds of antistatic agents.

In a case where the film-forming composition of the present embodiment contains an ionic surfactant as an antistatic agent, a content rate of the ionic surfactant in the film-forming composition with respect to the total solid content of the film-forming composition is preferably equal to or lower than 5% by mass, more preferably equal to or lower than 1% by mass, and even more preferably equal to or lower than 0.5% by mass.

From the viewpoint of effectively improving the antifouling properties of the film by the addition of the ionic surfactant, the content rate of the ionic surfactant in the film-forming composition is preferably equal to or higher than 0.01% by mass with respect to the total solid content of the film-forming composition.

In a case where the content rate of the ionic surfactant in the film-forming composition with respect to the total solid content of the film-forming composition is equal to or higher than 0.01% by mass and equal to or lower than 5% by mass, it is possible to form a film having excellent antifouling properties while inhibiting the aggregation of the silica particles.

In a case where the film-forming composition of the present embodiment contains the metal oxide particles as an antistatic agent, a content rate of the metal oxide particles in the film-forming composition with respect to the total solid content of the film-forming composition is preferably equal to or lower than 40% by mass, more preferably equal to or lower than 20% by mass, and even more preferably equal to or lower than 10% by mass.

From the viewpoint of effectively improving the antifouling properties of the film by the addition of the metal oxide particles, the content rate of the metal oxide particles in the film-forming composition is preferably equal to or higher than 1% by mass with respect to the total solid content of the film-forming composition.

In a case where the content rate of the metal oxide particles in the film-forming composition with respect to the total solid content of the film-forming composition is equal to or higher than 1% by mass and equal to or lower than 40% by mass, it is possible to effectively impart antistatic properties to the film without impairing film-forming properties in a case where the film is formed by coating.

(Surfactant)

It is preferable that the film-forming composition of the present embodiment contains a surfactant.

In a case where the film-forming composition of the present embodiment contains a surfactant, it is possible to form a film having properties of preventing the adhesion of a contaminant, that is, excellent antifouling properties.

Examples of the surfactant mentioned herein do not include the compounds exemplified above as antistatic agents that have surface-activating properties and an antistatic function (that is, ionic surfactants).

In the film-forming composition of the present embodiment, the antistatic agent and the surfactant may be used in combination regardless whether or not the antistatic agent exhibits surface-activating properties.

In a case where the antistatic agent is a compound which does not exhibit surface-activating properties, from the viewpoint of water washing properties, it is preferable that the film-forming composition contains a surfactant. In a case where the antistatic agent is a compound which exhibits surface-activating properties, from the viewpoint of further improving the antifouling properties, it is preferable that the film-forming composition contains a surfactant in addition to the antistatic agent.

In a case where the film-forming composition of the present embodiment contains a surfactant, the antifouling properties of the formed film are improved, and for example, the coating properties are improved in a case where the film is formed by coating. Specifically, in a case where the film-forming composition of the present embodiment contains a surfactant, the surface tension of the film-forming composition is reduced, and hence the uniformity of the film is further improved.

—Nonionic Surfactant—

Examples of the surfactant include a nonionic surfactant.

In a case where an ionic surfactant is used as an antistatic agent, provided that an excess of the ionic surfactant is present in the film-forming composition, the amount of electrolytes in the system increases, and hence the silica particles are easily aggregated. Therefore, it is preferable that the ionic surfactant is used in combination with a nonionic surfactant. Here, the nonionic surfactant does not need to be used in combination with the ionic surfactant, and the film-forming composition may contain only the nonionic surfactant as a surfactant.

Examples of the nonionic surfactant include polyalkylene glycol monoalkyl ether, polyalkylene glycol monoalkyl ester, polyalkylene glycol monoalkyl ester.monoalkyl ether, and the like. Specific examples of the nonionic surfactant include polyethylene glycol monolauryl ether, polyethylene glycol monostearyl ether, polyethylene glycol monocetyl ether, polyethylene glycol monolauryl ester, polyethylene glycol monostearyl ester, and the like.

In a case where the film-forming composition of the present embodiment contains a nonionic surfactant, as the nonionic surfactant, from the viewpoint of forming a film having further improved hydrophilicity and antifouling properties, a nonionic surfactant having an HLB value greater than 15 is preferable (hereinafter, referred to as "specific nonionic surfactant" as well).

In a case where the film-forming composition of the present embodiment contains the specific nonionic surfactant, the hydrophilicity of the formed film is further improved, the adhesion of a contaminant which is a hydrophobic component (for example, silicone) is excellent prevented.

The HLB value of the specific nonionic surfactant is preferably equal to or greater than 15.5, more preferably equal to or greater than 16, even more preferably equal to or greater than 17, and particularly preferably equal to or greater than 18.

The upper limit of the HLB value of the specific nonionic surfactant is not particularly limited, and preferably equal to or smaller than 20 for example.

The HLB value (Hydrophile-Lipophile Balance) of a surfactant shows the hydrophile-lipophile balance of the surfactant.

The HLB value of a surfactant in the present specification is an arithmetically calculated value defined by the Formula (I) by the Griffin's method (Completely Revised New Edition of Introduction to Surfactant, p. 128).

Formula (I) HLB value of surfactant=(molecular weight of portion of hydrophilic group/molecular weight of surfactant)×20       (I)

Examples of the specific nonionic surfactant include polyoxyalkylene alkyl ether, polyoxyalkylene alkyl phenol ether, polyoxyalkylene aryl ether, polyoxyalkylene alkyl aryl ether, a sorbitan derivative, a formalin condensate of polyoxyalkylene aryl ether, a formalin condensate of polyoxyalkylene alkyl aryl ether, polyethylene glycol, and the like.

Among these, as the specific nonionic surfactant, polyoxyalkylene alkyl ether is particularly preferable.

Examples of the alkyl group of the polyoxyalkylene alkyl ether as the specific nonionic surfactant include a linear alkyl group having 1 to 36 carbon atoms or a branched alkyl group having 3 to 36 carbon atoms.

It is preferable that the oxyalkylene portion of the polyoxyalkylene alkyl ether is polyoxyethylene, because then a film having particularly excellent hydrophilicity can be formed. The number of polyoxyethylene structural units contained in the specific nonionic surfactant is preferably equal to or greater than 6, more preferably equal to or greater than 10, even more preferably equal to or greater than 15, and particularly preferably equal to or greater than 20. Furthermore, for example, from the viewpoint of solubility, the number of polyoxyethylene structural units can be set to be equal to or smaller than 100.

In a case where the specific nonionic surfactant is polyoxyalkylene alkyl ether, a surfactant represented by Formula (II) is preferable.

RO—(C$_2$H$_4$O)$m$-H  (II)

In Formula (II), m represents an integer of 6 to 100. R represents a linear alkyl group having 1 to 36 carbon atoms or a branched alkyl group having 3 to 36 carbon atoms.

As the specific nonionic surfactant, commercial products can be used. Examples of the commercial products of the specific nonionic surfactant include EMALEX 715 (HLB value: 15.6), EMALEX 720 (HLB value: 16.5), EMALEX 730 (HLB value: 17.5), and EMALEX 750 (HLB value: 18.4) (trade names, polyoxyethylene lauryl ether) from NIHON EMULSION Co., Ltd., RHEODOL TW-P120 (trade name, polyoxyethylene sorbitan monopalmitate, HLB value: 15.6) from Kao Corporation, PEG 2000 (trade name, HLB value: 19.9) from Sanyo Chemical Industries, Ltd., and the like.

In a case where the film-forming composition of the present embodiment contains the nonionic surfactant, the film-forming composition may contain only one kind of nonionic surfactants or two or more kinds of nonionic surfactants.

In a case where the film-forming composition of the present embodiment contains a nonionic surfactant (preferably the specific nonionic surfactant), a content rate of the nonionic surfactant in the film-forming composition with respect to the total solid content of the film-forming composition is preferably equal to or higher than 0.01% by mass and equal to or lower than 15% by mass, more preferably equal to or higher than 0.1% by mass and equal to or lower than 10% by mass, and even more preferably equal to or higher than 1% by mass and equal to or lower than 10% by mass.

In a case where the content rate of the nonionic surfactant in the film-forming composition is within the above range, the hydrophilicity of the formed film becomes excellent, the adhesion of a contaminant which is a hydrophobic component (for example, silicone) is excellent prevented.

—Ionic Surfactant—

Examples of the surfactant include an ionic surfactant.

As the ionic surfactant, an ionic surfactant having at least either a phosphoric acid group or a carboxy group (hereinafter, referred to as "specific ionic surfactant" as well) is preferable.

In a case where the film-forming composition of the present embodiment contains the specific ionic surfactant, at least one functional group between the phosphoric acid group and the carboxy group contained in the specific ionic surfactant functions as an acid adsorptive group and is adsorbed onto the surface of the silica particles described above. Due to the adsorption, the dispersion stability of the silica particles is improved. Furthermore, due to the adsorption, the adsorption of hydrophobic components onto the surface of the silica particles is inhibited. Accordingly, excellent antifouling properties are maintained without impairing excellent hydrophilicity resulting from the silica particles.

Considering the adsorptivity with respect to the silica particles, the specific ionic surfactant is preferably an anionic surfactant, and more preferably a compound which has a hydrophobic group selected from a hydrocarbon group having 1 to 36 carbon atoms, an aliphatic cyclic hydrocarbon group such as a cyclohexyl group or a cyclobutyl group, and an aromatic hydrocarbon group such as a styryl group, a naphthyl group, a phenyl group, or a phenylene ether group and at least either a phosphoric acid group or a carboxy group as an acid adsorptive group. The aforementioned hydrophobic group may further have a substituent.

It is preferable that the specific ionic surfactant has at least only one kind of functional group selected from a phosphoric acid group or a carboxy group as an acid adsorptive group. That is, it is preferable that the specific ionic surfactant does not have an acid adsorptive group other than a phosphoric acid group and a carboxy group, such as a sulfonic acid group or a sulfuric acid group.

Examples of the specific ionic surfactant having a phosphoric acid group include an alkyl phosphoric acid ester salt, polyoxyethylene alkyl ether phosphate, and the like.

Examples of the specific ionic surfactant having a carboxy group include N-acylamino acid, polyoxyethylene alkyl ether carboxylate, aliphatic carboxylate, aliphatic dicarboxylate, a polycarboxylic acid-based copolymer having a weight-average molecular weight less than 25,000, a maleic acid-based copolymer having a weight-average molecular weight less than 25,000, and the like.

From the viewpoint of the dispersion stability of the silica particles and the inhibition of adsorption of the hydrophobic component, the acid value of the specific ionic surfactant is preferably equal to or smaller than 180 mgKOH/g, and more preferably equal to or smaller than 100 mgKOH/g.

The lower limit of the acid value of the specific ionic surfactant is not particularly limited, and is preferably 3 mgKOH/g for example.

The acid value of the specific ionic surfactant in the present specification can be measured by the titration of an indicator. Specifically, the acid value is a value obtained by calculation by measuring the amount (unit: mg) of potassium hydroxide neutralizing acid components in 1 g of the solid contents of the specific ionic surfactant according to the method described in Japanese Industrial Standards (JIS) K 0070.

As the specific ionic surfactant, commercial products can be used. Examples of the commercial products of the specific ionic surfactant include DISPERBYK (registered trademark)-2015 (acid adsorptive group: carboxy group, acid value: 10 mgKOH/g, solid contents: 40% by mass) and DISPERBYK (registered trademark)-180 (acid adsorptive group: phosphoric acid group, acid value: 94 mgKOH/g) from BYK-Chemie GmbH, TEGO (registered trademark) Dispers 660C (acid adsorptive group: phosphoric acid group, acid value: 30 mgKOH/g) from Evonik Industries AG, BYK (registered trademark)-P104 (acid adsorptive group: carboxy group, acid value: 180 mgKOH/g), and the like.

In a case where the film-forming composition of the present embodiment contains an ionic surfactant, the film-forming composition may contain only one kind of ionic surfactant or two or more kinds of ionic surfactants.

In a case where the film-forming composition of the present embodiment contains an ionic surfactant (preferably the specific ionic surfactant), a content rate of the ionic surfactant in the film-forming composition with respect to the total solid content of the film-forming composition is preferably equal to or higher than 0.05% by mass and equal to or lower than 50% by mass, more preferably equal to or higher than 0.5% by mass and equal to or lower than 20% by mass, and even more preferably equal to or higher than 1% by mass and equal to or lower than 15% by mass.

In a case where the content rate of the ionic surfactant in the film-forming composition is within the above range, the effect of preventing the aggregation of the silica particles and the effect of preventing the adsorption of the hydrophobic component are further improved, and the effect of improving antifouling properties of the hydrophilic film resulting from the addition of the ionic surfactant is easily obtained.

[Method for Preparing Film-Forming Composition]

The film-forming composition of the present embodiment can be prepared by mixing together the specific siloxane compound, the silica particles, the ketone-based solvent, water, and the aforementioned optional components which are used if necessary.

For example, as the method for preparing the film-forming composition of the present embodiment, first, it is preferable to mix the specific siloxane compound with a solvent containing water so as to form a hydrolysate of the specific siloxane compound and prepare a hydrolysis solution containing the hydrolysate of the specific siloxane compound.

Then, the ketone-based solvent and the silica particles are added to the obtained hydrolysis solution. At this time, if desired, a specific solvent, a polyacrylic acid, a glycol-based solvent, a surfactant, a condensation-accelerating catalyst, an antistatic agent, and the like which are optional components described above can be added.

The hydrolysis reaction of the specific siloxane compound also proceeds at room temperature (25° C.). However, in order to accelerate the reaction, the specific siloxane compound and water may be brought into contact with each other so as to prepare a mixed solution, and then the obtained mixed solution may be heated to a temperature of about 30° C. to 50° C. It is preferable that the hydrolysis reaction is performed for a long period of time, because then the reaction proceeds further. From the viewpoint of making the hydrolysis reaction to sufficiently proceed, it is also preferable that the reaction is performed for 1 hour to 36 hours in a heating state.

By allowing a catalyst, which accelerates the hydrolysis reaction of the specific siloxane compound, to coexist in the mixed solution containing the specific siloxane compound and water, a hydrolysate of the specific siloxane compound necessary for hydrophilicity can be obtained within about half a day.

The hydrolysis reaction of the specific siloxane compound is a reversible reaction. Therefore, in a case where water is removed from the mixed solution containing the hydrolysate of the specific siloxane compound, a condensation reaction between hydroxy groups of the hydrolysate of the specific siloxane compound starts and proceeds. Accordingly, in a case where the hydrolysate of the specific siloxane compound is obtained by allowing the hydrolysis reaction of the specific siloxane compound to proceed in the mixed solution containing the specific siloxane compound and water (preferably an excess of water), it is preferable to prepare the film-forming composition by mixing the mixed solution as it is together with the silica particles and the like without isolating the obtained hydrolysate.

In a case where the amount of moisture in the film-forming composition is reduced due to storage or the like, the condensation reaction of the hydrolysate of the specific siloxane compound proceeds. As a result, sometimes the film-forming composition contains a condensation reaction product of the hydrolysate of the specific siloxane compound.

[Use of Film-Forming Composition]

The film-forming composition of the present embodiment contains the hydrolysate of the specific siloxane compound, the silica particles, and water in combination with the ketone-based solvent as a solvent. Accordingly, the composition can form a film having excellent transparency and adhesiveness.

Furthermore, because the film-forming composition of the embodiment contains the hydrolysate of the specific siloxane compound and the silica particles, the composition can form a film having excellent hydrophilicity. In a case where the film has excellent hydrophilicity, a contact angle of water adhering to the surface of the film is reduced. Consequently, fogging of the film that occurs due to the adhesion of tiny water drops to the surface of the film is inhibited. That is, the film formed of the film-forming composition of the present embodiment has excellent antifogging properties.

Accordingly, the film-forming composition of the present embodiment can be suitably used because the composition imparting functions such as antifogging properties to a protective material (so-called protective cover) for protecting a monitoring camera, a lighting, a sensor lamp fitting, and the like; a roofing material of garages for vehicles such as an automobile or a bicycle; a sign such as a road sign; a noise barrier for being installed in a highway shoulder or for a railroad; the body of a vehicle such as an automobile or a bicycle; a protective material (for example, a lens) of window glass, a mirror, or a light of automobiles; and the like.

The film-forming composition of the present embodiment can be more suitably used for the protective material of lights of an automobile (a headlight, a tail lamp, a door mirror winker light, and the like) and for the protective material of a monitoring camera among the above.

Generally, an automobile comprises a light unit constituted with a light and a lens for protecting the light. In a case where moisture permeates the light unit for a certain reason, fogging occurs on the lens. The fogging can also occur on a protective cover of a monitoring camera having the protective cover (that is, a monitoring camera integrated with a housing). The film formed using the film-forming composition of the present embodiment has excellent transparency. Therefore, the film does not impair the function and performance of lights of an automobile and a monitoring camera. Furthermore, because the film has excellent adhesiveness, excellent antifogging properties can be maintained for a long period of time.

<Film>

The film of the present embodiment is formed of the aforementioned film-forming composition of the present embodiment, and contains at least a condensation reaction product of the hydrolysate of the specific siloxane compound (hereinafter, simply referred to as "condensation reaction product" as well) and silica particles.

The film of the present embodiment has excellent transparency and adhesiveness.

Furthermore, because the film of the present embodiment contains the condensation reaction product of the hydrolysate of the specific siloxane compound, the hydrophilicity of the surface thereof is excellent, and the film has hardness unproblematic for practical use.

The film of the present embodiment may contain only one kind of condensation reaction product or two or more kinds of condensation reaction products.

Hereinafter, preferable physical properties of the film of the present embodiment will be described.

(Water Contact Angle)

A water contact angle of the film of the present embodiment is preferably equal to or smaller than 30°, more preferably equal to or smaller than 20°, even more preferably equal to or smaller than 15°, and particularly preferably equal to or smaller than 10°.

The water contact angle of the film that is equal to or smaller than 30° shows that the surface of the film has further improved hydrophilicity.

For determining the water contact angle of the film, by using a fully automatic contact angle meter (model number: DM-701, Kyowa Interface Science Co., LTD.) as a measurement apparatus, 1 µL of pure water is added dropwise to the surface of the film under the condition of an atmospheric temperature of 25° C., and the contact angle is measured five times by a θ/2 method. The arithmetic mean of the obtained values is adopted as the water contact angle.

(Amount of Water Absorbed)

The amount of water absorbed into the film of the present embodiment is preferably equal to or smaller than 25 mg/cm$^2$.

In a case where a thin film is formed, the amount of water absorbed is preferably equal to or smaller than 5.0 mg/cm$^2$, more preferably equal to or smaller than 2.5 mg/cm$^2$, and even more preferably equal to or smaller than 1.0 mg/cm$^2$. In a case where a thick film is formed, the amount of water absorbed is preferably equal to or smaller than 25 mg/cm$^2$, more preferably equal to or smaller than 12 mg/cm$^2$, and even more preferably equal to or smaller than 6 mg/cm$^2$.

In a case where a thin film is formed, provided that the amount of water absorbed into the film is equal to or greater than 0.3 mg/cm$^2$ and equal to or smaller than 5 mg/cm$^2$, the film does not easily swell. Accordingly, excellent adhesiveness tends to be easily obtained. In a case where a thick film is formed, provided that the amount of water absorbed into the film is equal to or greater than 1.5 mg/cm$^2$ and equal to or smaller than 25 mg/cm$^2$, transparency of the film and antifogging properties that excellently last for a long period of time tend to be easily obtained.

The amount of water absorbed into the film is measured by the following method. First, a laminate comprising the film on a substrate is prepared. The mass of the laminate is measured, and the measured value is adopted as "initial mass". Then, a hot water bath with a temperature of 60° C. is prepared. Under the conditions of an atmospheric temperature of 25° C. and a relative humidity of 50%, only a 5 cm×5 cm region of the film in the laminate is brought into contact with the vapor of the hot water bath in a state where a distance of 5 cm is being maintained between the surface of water in the hot water bath and the film. The film is brought into contact with the vapor to such an extent that the laminate does not drip water in a case where the laminate is tilted vertically. Thereafter, the mass of the laminate is measured, and the measured value is adopted as "mass after test". From the initial mass and the mass after test, an increment of mass resulting from the test is calculated, and a mass per unit area brought into contact with the vapor is determined and adopted as the amount of water absorbed (unit: mg/cm$^2$).

<Laminate>

The laminate of the present embodiment comprises the aforementioned film of the present embodiment on a substrate.

Because the laminate of the present embodiment comprises the film of the present embodiment, the adhesiveness between the substrate and the film is excellent.

The material of the substrate is not particularly limited, and can be used by being appropriately selected from various materials such as glass, a resin (that is, plastic), a metal, and ceramics. Furthermore, as the material of the substrate, a composite material formed of a plurality of materials can also be used. For example, the material of the substrate may be a composite material including glass and a resin material in which the glass and the resin material mixed together and form a composite, a composite resin material in which a plurality of kinds of resin materials are kneaded together or bonded to each other, and the like.

In a case where a glass substrate is used as the substrate, the condensation between hydroxy groups on silicon in the hydrolysate of the specific siloxane compound also occurs between hydroxy groups on the surface of the glass. Accordingly, a film exhibiting further improved adhesiveness with respect to the substrate is formed.

As the material of the substrate, a resin material is also suitable. For example, in a protective material for lights of an automobile and a protective material for a monitoring camera, a resin material is used in many cases.

In a case where the material of the substrate is a resin material, as the substrate, a polycarbonate substrate, a polymethyl methacrylate substrate, or a polyethylene terephthalate substrate is preferable because this substrate makes it possible to form a laminate which exhibits excellent durability against light and allows the substrate to exhibit excellent adhesiveness with respect to the film of the present embodiment while maintaining transparency. The substrate is more preferably a polycarbonate substrate or a polymethyl methacrylate substrate, and even more preferably a polycarbonate substrate, because this substrate makes it possible to form a laminate having further improved adhesiveness.

The thickness of the substrate is not particularly limited, and is appropriately set according to the object to which the film-forming composition of the present embodiment is applied.

The thickness of the film is preferably equal to or greater than 20 nm, more preferably equal to or greater than 50 nm, and even more preferably equal to or greater than 75 nm. In a case where the thickness of the film is equal to or greater than 20 nm, the scratch resistance of the film is further improved.

From the viewpoint of transparency, the thickness of the film is preferably equal to or smaller than 20 μm, and more preferably equal to or smaller than 5 μm. In a case where a thin film is formed, the thickness of the film is equal to or smaller than 1 μm, preferably equal to or smaller than 500 nm, and even more preferably equal to or smaller than 250 nm. In a case where a thick film having a thickness greater than 1 μm is formed, the thickness of the film is preferably equal to or smaller than 20 μm, more preferably equal to or smaller than 10 μm, and even more preferably equal to or smaller than 5 μm.

[Manufacturing Method of Laminate]

The manufacturing method of a laminate of the present embodiment is not particularly limited as long as the aforementioned laminate of the present embodiment can be manufactured.

The laminate of the present embodiment can be manufactured, for example, by a method including forming a film by applying the aforementioned film-forming composition onto a substrate.

The method for applying the film-forming composition onto a substrate is not particularly limited, but is preferably a coating method. The coating method for coating a substrate with the film-forming composition is not particularly limited, and known coating methods such as spray coating, brush coating, roller coating, bar coating, and dip coating (so-called immersion coating) can be used. In a case where coating is performed on three-dimensional structures having various surface shapes such as a curved surface and asperities, as the coating method, spray coating is preferable among the above.

In a case where a substrate is coated with the film-forming composition by spray coating, the setting method of the substrate is not particularly limited. It is possible to perform coating while appropriately changing the substrate direction according to the shape of the substrate such that the substrate becomes, for example, horizontal or perpendicular to the coating direction. In order to obtain more uniform coating film thickness, the substrate is coated preferably in a state where spray nozzles are disposed in a position in which the nozzles and the substrate are spaced apart at equal intervals, and more preferably in a state where the nozzles and the substrate are spaced apart at a distance equal to or longer than 10 mm and equal to or shorter than 1,000 mm.

As a method for supplying the film-forming composition to a coating device, it is possible to use any method such as pressure feeding, sucking up, or gravity feeding.

The nozzle diameter of the spray nozzle is preferably equal to or greater than 0.1 mmφ and equal to or smaller than 1.8 mmφ, and the air pressure is preferably equal to or higher than 0.02 MPa and equal to or lower than 0.60 MPa. In a case where the coating is performed under these conditions, the coating film thickness can be further uniformized. In order to form a more suitable coating film by spray coating, the amount of air, the amount of the film-forming composition sprayed, a pattern opening, and the like need to be adjusted.

In a case where the substrate is coated with the film-forming composition by spray coating, the amount of air is preferably equal to or greater than 5 L/min and equal to or smaller than 600 L/min, the amount of the paint sprayed is preferably equal to or greater than 5 L/min and equal to or smaller than 600 L/min, and the pattern opening is preferably equal to or greater than 40 mm and equal to or smaller than 450 mm.

In the spray coating, the environment at the time of coating also affects the formation of the coating film. The temperature condition is preferably equal to or higher than 15° C. and equal to or lower than 35° C., and the humidity condition is preferably equal to or lower than 80% RH.

The cleanness is not particularly limited. However, for example, from the viewpoint of inhibiting the planar failure resulting from the fine particles (that is, particles) in the coating environment, the cleanness is preferably equal to or higher than class 10,000 and more preferably equal to or higher than class 1,000.

The amount of the film-forming composition used for coating is not particularly limited. According to the concentration of the solid contents in the film-forming composition, the desired film thickness, and the like, the amount of the film-forming composition used for coating can be appropriately set in consideration of operability and the like. For example, the amount of the film-forming composition used for coating is preferably equal to or greater than 1 mL/m$^2$ and equal to or smaller than 400 mL/m$^2$, more preferably equal to or greater than 2 mL/m$^2$ and equal to or smaller than 100 mL/m$^2$, even more preferably equal to or greater than 4 mL/m$^2$ and equal to or smaller than 40 mL/m$^2$, and particularly preferably equal to or greater than 6 mL/m$^2$ and equal to or smaller than 20 mL/m$^2$. In a case where the amount of the film-forming composition used for coating is within the above range, the coating accuracy becomes excellent.

It is preferable that the manufacturing method of a laminate of the present embodiment includes drying the film-forming composition applied onto the substrate.

The film-forming composition may be dried using a heating device. The heating device is not particularly limited as long as it can heat the composition to the intended temperature, and any of known heating devices can be used. As the heating device, in addition to an oven, an electric furnace, and the like, a heating device which is separately prepared according to the manufacturing line can be used.

The drying condition of the film-forming composition is not particularly limited, and can be appropriately set in consideration of the curing properties of the coating film.

The drying of the film-forming composition may be performed under a constant temperature condition in which a preset temperature is allowed to remain constant or may be performed by step-wise changing the temperature condition.

In a case where the film-forming composition is dried under a constant temperature condition, the film-forming composition is dried preferably under a condition in which the composition is heated for 1 minute to 60 minutes by setting the surface temperature thereof to be equal to or higher than 20° C. and equal to or lower than 150° C., more preferably under a condition in which the composition is heated for 1 minute to 60 minutes by setting the surface temperature thereof to be equal to or higher than 40° C. and equal to or lower than 150° C., and even more preferably under a condition in which the composition is heated for 1 minute to 60 minutes by setting the surface temperature thereof to be equal to or higher than 60° C. and equal to or lower than 150° C.

In a case where the film-forming composition is dried by step-wise changing the temperature condition, it is preferable that the drying is divided into preliminary drying and permanent drying. It is preferable that the preliminary drying is performed under a condition in which the composition is heated for 5 seconds to 10 minutes by setting the surface temperature thereof to be equal to or higher than 20° C. and equal to or lower than 60° C.

The surface temperature can be measured using an infrared thermometer or the like.

In a case where the drying of the film-forming composition is performed by drying air blowing, the amount of the drying air can be appropriately set in consideration of the optimal temperature of the air having reached the substrate. However, considering drying unevenness, the amount of the air is preferably reduced as much as possible, and is more preferably zero. That is, it is more preferable that the drying is performed under a condition in which the drying air does not directly contact the substrate.

The substrate coated with the film-forming composition may be dried in a state of lying flat (that is, disposed horizontally) on a pedestal, in a state of standing upright, or in a suspended state according to the shape of the substrate.

After being used for coating, the parts of the spray gun, the coating device, and the like may be washed with a solvent such as thinner, water, alcohol, a surfactant, or the like. Furthermore, in order to effectively wash contaminants to which scales and the like have adhered, the residual film-forming composition, and the like, an acidic or alkaline aqueous solution is preferably used for washing, and an aqueous solution with pH equal to or lower than 3.0 or an aqueous solution with pH equal to or higher than 8.0 is more preferably used for washing. The temperature of the washing solution is preferably equal to or higher than room temperature, and more preferably equal to or higher than 50° C.

The container for storing the film-forming composition is not particularly limited, and may be a container made of a metal such as a 18-liter square can or a royal can or a container made of a resin such as polyethylene or polypropylene.

The storage temperature of the film-forming composition is preferably equal to or higher than 0° C. and equal to or lower than 50° C.

EXAMPLES

Hereinafter, the present invention will be more specifically described based on examples, but the present invention is not limited to the following examples as long as the gist of the present invention is maintained.

Example 1

(Preparation of Film-Forming Composition)

The components shown in the following "Composition of hydrolysis solution A" were mixed together and stirred for 12 hours at 25° C., thereby preparing a hydrolysis solution A.

—Composition of Hydrolysis Solution A—

| | |
|---|---|
| MKC (registered trademark) SILICATE MS51 [Mitsubishi Chemical Corporation] | 0.74 parts by mass |
| Acetone [ketone-based solvent, SP value: 10.0 MPa$^{1/2}$] | 1.54 parts by mass |

-continued

| | |
|---|---|
| Distilled water | 3.26 parts by mass |
| 0.1 mol/L aqueous hydrochloric acid solution | 0.08 parts by mass |

MKC (registered trademark) SILICATE MS51 described above is a siloxane compound represented by Formula (1) (that is, the specific siloxane compound). In Formula (1), all of $R^1$, $R^2$, $R^3$, and $R^4$ represent a methyl group, and the average of n is 5.

Then, the components shown in the following "Composition B" are added to and mixed with the entirety of the hydrolysis solution A obtained as above, thereby obtaining a film-forming composition.

—Composition B—

| | |
|---|---|
| Acetone [ketone-based solvent] | 81.71 parts by mass |
| Aluminum chelate D [condensation-accelerating catalyst, Kawaken Fine Chemicals Co., Ltd.] (10% by mass diluted solution prepared using acetone) | 4.17 parts by mass |
| Sodium di(2-ethylhexyl)sulfosuccinate [ionic surfactant as antistatic agent, NOF CORPORATION] (0.2% by mass diluted solution prepared using mixed solution of water/acetone (mass ratio: 1/4)) | 1.54 parts by mass |
| SNOWTEX (registered trademark) OUP [silica particles, average primary particle diameter: 9 nm to 15 nm, solid contents: 15% by mass, NISSAN CHEMICAL INDUSTRIES, LTD.] | 6.95 parts by mass |

(Preparation of Laminate)

A polycarbonate substrate [trade name: CARBOGLASS (registered trademark) C-110, thickness: 0.5 mm, ASAHI GLASS CO., LTD.] as a substrate was coated with the film-forming composition obtained as above by using a spray gun (model type: W-101-101G, ANEST IWATA Corporation). After coating, the polycarbonate substrate coated with the film-forming composition was left to stand for 1 minute at 25° C. After being left to stand, the film-forming composition, with which the substrate was coated, was dried by being heated for 20 minutes at 120° C., thereby preparing a laminate comprising a film having a thickness of 100 nm on the substrate.

Example 2

The components shown in the following "Composition of hydrolysis solution C" were mixed together and stirred for 12 hours at 25° C., thereby preparing a hydrolysis solution C.

—Composition of Hydrolysis Solution C—

| | |
|---|---|
| MKC (registered trademark) SILICATE MS51 [Mitsubishi Chemical Corporation] | 0.74 parts by mass |
| Ethanol (95) [specific solvent: alcohol-based solvent] | 1.54 parts by mass |
| Distilled water | 3.26 parts by mass |
| 0.1 mol/L aqueous hydrochloric acid solution | 0.08 parts by mass |

Then, the components shown in the following "Composition D" were added to and mixed with the entirety of the hydrolysis solution C obtained as above, thereby obtaining a film-forming composition.

—Composition D—

| | |
|---|---|
| Acetone [ketone-based solvent] | 39.12 parts by mass |
| Ethanol (95) [specific solvent: alcohol-based solvent] | 42.59 parts by mass |
| Aluminum chelate D [condensation-accelerating catalyst, Kawaken Fine Chemicals Co., Ltd.] (10% by mass diluted solution prepared using ethanol (95)) | 4.17 parts by mass |
| Sodium di(2-ethylhexyl)sulfosuccinate [ionic surfactant as antistatic agent, NOF CORPORATION] (0.2% by mass diluted solution prepared using mixed solution of water/ethanol (95) (mass ratio: 1/4)) | 1.54 parts by mass |
| SNOWTEX (registered trademark) OUP [silica particles, NISSAN CHEMICAL INDUSTRIES, LTD.] | 6.95 parts by mass |

(Preparation of Laminate)

By using the film-forming composition obtained as above, a laminate comprising a film on the substrate was prepared in the same manner as in Example 1.

Example 3

A film-forming composition and a laminate were prepared by performing the same operation as that in Example 2, except that in Example 2, "cyclohexanone (SP value: 9.9 MPa$^{1/2}$)" was used as a ketone-based solvent instead of "acetone".

Example 4

A film-forming composition and a laminate were prepared by performing the same operation as that in Example 2, except that in Example 2, "acetyl acetone (SP value: 10.3 MPa$^{1/2}$)" was used as a ketone-based solvent instead of "acetone".

Example 5

A film-forming composition and a laminate were prepared by performing the same operation as that in Example 2, except that in Example 2, "cyclopentanone (SP value: 10.4 MPa$^{1/2}$)" was used as a ketone-based solvent instead of "acetone".

Example 6

A film-forming composition and a laminate were prepared by performing the same operation as that in Example 2, except that in Example 2, "diacetone alcohol (SP value: 10.2 MPa$^{1/2}$)" was used as a ketone-based solvent instead of "acetone".

Example 7

A film-forming composition and a laminate were prepared by performing the same operation as that in Example 6, except that in Example 6, as the specific solvent, an alcohol-based solvent "n-propanol" was used instead of an alcohol-based solvent "ethanol". "Ethanol" mentioned herein refers to all the ethanols used for preparing the film-forming composition and includes ethanol used for preparing the diluted solution.

Example 8

A film-forming composition and a laminate were prepared by performing the same operation as that in Example 6, except that in Example 6, as the specific solvent, an ether-based solvent "1,2-dimethoxyethane" was used instead of an alcohol-based solvent "ethanol". "Ethanol" mentioned herein refers to all the ethanols used for preparing the film-forming composition and includes ethanol used for preparing the diluted solution.

Example 9

A film-forming composition and a laminate were prepared by performing the same operation as that in Example 6, except that in Example 6, as the specific solvent, a glycol ether-based solvent "propylene glycol monomethyl ether" was used instead of an alcohol-based solvent "ethanol". "Ethanol" mentioned herein refers to all the ethanols used for preparing the film-forming composition and includes ethanol used for preparing the diluted solution.

Example 10

A film-forming composition and a laminate were prepared by performing the same operation as that in Example 9, except that in Example 9, the components added to and mixed with the hydrolysis solution were changed to the components shown in the following "Composition E".

—Composition E—

| | |
|---|---|
| Diacetone alcohol [ketone-based solvent] | 39.17 parts by mass |
| Propylene glycol monomethyl ether [specific solvent: glycol ether-based solvent] | 39.17 parts by mass |
| Aluminum chelate D [condensation-accelerating catalyst, Kawaken Fine Chemicals Co., Ltd.] (10% by mass diluted solution prepared using propylene glycol monomethyl ether) | 4.17 parts by mass |
| Sodium di(2-ethylhexyl)sulfosuccinate [ionic surfactant as antistatic agent, NOF CORPORATION] (0.2% by mass diluted solution prepared using mixed solution of water/propylene glycol monomethyl ether (mass ratio: 1/4)) | 1.54 parts by mass |
| SNOWTEX (registered trademark) OUP [silica particles, NISSAN CHEMICAL INDUSTRIES, LTD.] | 6.95 parts by mass |
| Polyacrylic acid [adhesion aid, weight-average molecular weight: 25,000, Shonan Wako Junyaku K.K.] (0.1% by mass diluted solution prepared using propylene glycol monomethyl ether) | 3.50 parts by mass |

Example 11

A film-forming composition and a laminate were prepared by performing the same operation as that in Example 10, except that in Example 10, a polyacrylic acid [Sigma-Aldrich Co. LLC.] having a weight-average molecular weight of 130,000 was used instead of the polyacrylic acid having a weight-average molecular weight of 25,000. The polyacrylic acid was used for preparing the film-forming composition after being made into a 0.1% by mass diluted solution by using propylene glycol monomethyl ether as in Example 10.

Example 12

A film-forming composition and a laminate were prepared by performing the same operation as that in Example 10, except that in Example 10, a polyacrylic acid [Shonan Wako Junyaku K.K.] having a weight-average molecular weight of 250,000 was used instead of the polyacrylic acid having a weight-average molecular weight of 25,000. The polyacrylic acid was used for preparing the film-forming composition after being made into a 0.1% by mass diluted solution by using propylene glycol monomethyl ether as in Example 10.

Example 13

A film-forming composition and a laminate were prepared by performing the same operation as that in Example 10, except that in Example 10, a polyacrylic acid [Shonan Wako Junyaku K.K.] having a weight-average molecular weight of 1,000,000 was used instead of the polyacrylic acid having a weight-average molecular weight of 25,000. The polyacrylic acid was used for preparing the film-forming composition after being made into a 0.1% by mass diluted solution by using propylene glycol monomethyl ether as in Example 10.

Example 14

A film-forming composition and a laminate were prepared by performing the same operation as that in Example 12, except that in Example 12, the components added to and mixed with the hydrolysis solution were changed to the components shown in the following "Composition F".

—Composition F—

| | |
|---|---|
| Diacetone alcohol [ketone-based solvent] | 39.17 parts by mass |
| Propylene glycol monomethyl ether [specific solvent: glycol ether-based solvent] | 29.38 parts by mass |
| Dipropylene glycol [viscosity adjuster, glycol-based solvent] | 9.79 parts by mass |
| Aluminum chelate D [condensation-accelerating catalyst, Kawaken Fine Chemicals Co., Ltd.] (10% by mass diluted solution prepared using propylene glycol monomethyl ether) | 4.17 parts by mass |
| Sodium di(2-ethylhexyl)sulfosuccinate [ionic surfactant as antistatic agent, NOF CORPORATION] (0.2% by mass diluted solution prepared using mixed solution of water/propylene glycol monomethyl ether (mass ratio: 1/4)) | 1.54 parts by mass |
| SNOWTEX (registered trademark) OUP [silica particles, NISSAN CHEMICAL INDUSTRIES, LTD.] | 6.95 parts by mass |
| Polyacrylic acid [weight-average molecular weight: 250,000] (0.1% by mass diluted solution prepared using propylene glycol monomethyl ether) | 3.50 parts by mass |

Example 15

A film-forming composition and a laminate were prepared by performing the same operation as that in Example 14, except that in Example 14, as a viscosity adjuster, a glycol-based solvent "propylene glycol" was used instead of a glycol-based solvent "dipropylene glycol".

Example 16

A film-forming composition and a laminate were prepared by performing the same operation as that in Example 15, except that in Example 15, the components added to and mixed with the hydrolysis solution were changed to the components shown in the following "Composition G".

—Composition G—

| | |
|---|---|
| Diacetone alcohol [ketone-based solvent] | 9.79 parts by mass |
| Propylene glycol monomethyl ether [specific solvent: glycol ether-based solvent] | 58.76 parts by mass |
| Propylene glycol [viscosity adjuster, glycol-based solvent] | 9.79 parts by mass |
| Aluminum chelate D [condensation-accelerating catalyst, Kawaken Fine Chemicals Co., Ltd.] (10% by mass diluted solution prepared using propylene glycol monomethyl ether) | 4.17 parts by mass |
| Sodium di(2-ethylhexyl)sulfosuccinate [ionic surfactant as antistatic agent, NOF CORPORATION] (0.2% by mass diluted solution prepared using mixed solution of water/propylene glycol monomethyl ether (mass ratio: 1/4)) | 1.54 parts by mass |
| SNOWTEX (registered trademark) OUP [silica particles, NISSAN CHEMICAL INDUSTRIES, LTD.] | 6.95 parts by mass |
| Polyacrylic acid [weight-average molecular weight: 250,000] (0.1% by mass diluted solution prepared using propylene glycol monomethyl ether) | 3.50 parts by mass |

Example 17

A film-forming composition and a laminate were prepared by performing the same operation as that in Example 15, except that in Example 15, the components added to and mixed with the hydrolysis solution were changed to the components shown in the following "Composition H".

—Composition H—

| | |
|---|---|
| Diacetone alcohol [ketone-based solvent] | 19.58 parts by mass |
| Propylene glycol monomethyl ether [specific solvent: glycol ether-based solvent] | 48.96 parts by mass |
| Propylene glycol [viscosity adjuster, glycol-based solvent] | 9.79 parts by mass |
| Aluminum chelate D [condensation-accelerating catalyst, Kawaken Fine Chemicals Co., Ltd.] (10% by mass diluted solution prepared using propylene glycol monomethyl ether) | 4.17 parts by mass |
| Sodium di(2-ethylhexyl)sulfosuccinate [ionic surfactant as antistatic agent, NOF CORPORATION] (0.2% by mass diluted solution prepared using mixed solution of water/propylene glycol monomethyl ether (mass ratio: 1/4)) | 1.54 parts by mass |
| SNOWTEX (registered trademark) OUP [silica particles, NISSAN CHEMICAL INDUSTRIES, LTD.] | 6.95 parts by mass |
| Polyacrylic acid [weight-average molecular weight: 250,000] (0.1% by mass diluted solution prepared using propylene glycol monomethyl ether) | 3.50 parts by mass |

Example 18

A film-forming composition and a laminate were prepared by performing the same operation as that in Example 15, except that in Example 15, the components added to and mixed with the hydrolysis solution were changed to the components shown in the following "Composition I".

—Composition I—

| | |
|---|---|
| Diacetone alcohol [ketone-based solvent] | 58.75 parts by mass |
| Propylene glycol monomethyl ether [specific solvent: glycol ether-based solvent] | 9.80 parts by mass |
| Propylene glycol [viscosity adjuster, glycol-based solvent] | 9.79 parts by mass |
| Aluminum chelate D [condensation-accelerating catalyst, Kawaken Fine Chemicals Co., Ltd.] (10% by mass diluted solution prepared using propylene glycol monomethyl ether) | 4.17 parts by mass |
| Sodium di(2-ethylhexyl)sulfosuccinate [ionic surfactant as antistatic agent, NOF CORPORATION] (0.2% by mass diluted solution prepared using mixed solution of water/propylene glycol monomethyl ether (mass ratio: 1/4)) | 1.54 parts by mass |
| SNOWTEX (registered trademark) OUP [silica particles, NISSAN CHEMICAL INDUSTRIES, LTD.] | 6.95 parts by mass |
| Polyacrylic acid [weight-average molecular weight: 250,000] (0.1% by mass diluted solution prepared using propylene glycol monomethyl ether) | 3.50 parts by mass |

Example 19

A film-forming composition and a laminate were prepared by performing the same operation as that in Example 15, except that in Example 15, the components added to and mixed with the hydrolysis solution were changed to the components shown in the following "Composition J".

—Composition J—

| | |
|---|---|
| Diacetone alcohol [ketone-based solvent] | 39.17 parts by mass |
| Propylene glycol monomethyl ether [specific solvent: glycol ether-based solvent] | 34.28 parts by mass |
| Propylene glycol [viscosity adjuster, glycol-based solvent] | 4.90 parts by mass |
| Aluminum chelate D [condensation-accelerating catalyst, Kawaken Fine Chemicals Co., Ltd.] (10% by mass diluted solution prepared using propylene glycol monomethyl ether) | 4.17 parts by mass |
| Sodium di(2-ethylhexyl)sulfosuccinate [ionic surfactant as antistatic agent, NOF CORPORATION] (0.2% by mass diluted | 1.54 parts by mass | solution prepared using mixed solution of water/propylene glycol monomethyl ether (mass ratio: 1/4))

| | |
|---|---|
| SNOWTEX (registered trademark) OUP [silica particles, NISSAN CHEMICAL INDUSTRIES, LTD.] | 6.95 parts by mass |
| Polyacrylic acid [weight-average molecular weight: 250,000] (0.1% by mass diluted solution prepared using propylene glycol monomethyl ether) | 3.50 parts by mass |

Example 20

A film-forming composition and a laminate were prepared by performing the same operation as that in Example 15, except that in Example 15, the components added to and mixed with the hydrolysis solution were changed to the components shown in the following "Composition K".

—Composition K—

| | |
|---|---|
| Diacetone alcohol [ketone-based solvent] | 39.17 parts by mass |
| Propylene glycol monomethyl ether [specific solvent: glycol ether-based solvent] | 9.80 parts by mass |
| Propylene glycol [viscosity adjuster, glycol-based solvent] | 29.38 parts by mass |
| Aluminum chelate D [condensation-accelerating catalyst, Kawaken Fine Chemicals Co., Ltd.] (10% by mass diluted solution prepared using propylene glycol monomethyl ether) | 4.17 parts by mass |
| Sodium di(2-ethylhexyl)sulfosuccinate [ionic surfactant as antistatic agent, NOF CORPORATION] (0.2% by mass diluted solution prepared using mixed solution of water/propylene glycol monomethyl ether (mass ratio: 1/4)) | 1.54 parts by mass |
| SNOWTEX (registered trademark) OUP [silica particles, NISSAN CHEMICAL INDUSTRIES, LTD.] | 6.95 parts by mass |
| Polyacrylic acid [weight-average molecular weight: 250,000] (0.1% by mass diluted solution prepared using propylene glycol monomethyl ether) | 3.50 parts by mass |

Example 21

The components shown in the following "Composition of hydrolysis solution L" were mixed together and stirred for 12 hours at 25° C., thereby preparing a hydrolysis solution L.

—Composition of Hydrolysis Solution L—

| | |
|---|---|
| MKC (registered trademark) SILICATE MS51 [Mitsubishi Chemical Corporation] | 0.74 parts by mass |
| Propylene glycol monomethyl ether [specific solvent: glycol ether-based solvent] | 1.54 parts by mass |
| Distilled water | 3.26 parts by mass |
| 0.1 mol/L aqueous hydrochloric acid solution | 0.08 parts by mass |

Then, the components shown in the following "Composition N" were added to and mixed with the entirety of the hydrolysis solution L obtained as above, thereby obtaining a film-forming composition. By using the obtained film-forming composition, a laminate was prepared.

—Composition N—

| | |
|---|---|
| Diacetone alcohol [ketone-based solvent] | 42.86 parts by mass |
| Propylene glycol monomethyl ether [specific solvent: glycol ether-based solvent] | 35.94 parts by mass |
| Aluminum chelate D [condensation-accelerating catalyst, Kawaken Fine Chemicals Co., Ltd.] (10% by mass diluted solution prepared using propylene glycol monomethyl ether) | 4.17 parts by mass |
| Sodium di(2-ethylhexyl)sulfosuccinate [ionic surfactant as antistatic agent, NOF CORPORATION] (0.2% by mass diluted solution prepared using mixed solution of water/propylene glycol monomethyl ether (mass ratio: 1/4)) | 1.54 parts by mass |
| Silica dispersion M | 15.93 parts by mass |

| | |
|---|---|
| Polyacrylic acid [weight-average molecular weight: 250,000] (0.1% by mass diluted solution prepared using propylene glycol monomethyl ether) | 3.50 parts by mass |

The silica dispersion M was prepared by mixing together the components shown in the following "Composition of silica dispersion M" and stirring the mixture for 1 hour at 25° C.

—Composition of Silica Dispersion M—

| | |
|---|---|
| SNOWTEX (registered trademark) OUP [silica particles, NISSAN CHEMICAL INDUSTRIES, LTD.] | 13.89 parts by mass |
| DISPERBYK (registered trademark)-2015 [specific ionic surfactant, acid adsorptive group: carboxy group, acid value: 10 mgKOH/g, solid contents: 40% by mass, BYK-Chemie GmbH] | 1.04 parts by mass |
| Propylene glycol monomethyl ether [specific solvent: glycol ether-based solvent] | 16.93 parts by mass |

Example 22

A film-forming composition and a laminate were prepared by performing the same operation as that in Example 21, except that in Example 21, the components added to and mixed with the hydrolysis solution were changed to the components shown in the following "Composition O".

—Composition O—

| | |
|---|---|
| Diacetone alcohol [ketone-based solvent] | 42.86 parts by mass |
| Propylene glycol monomethyl ether [specific solvent: glycol ether-based solvent] | 35.94 parts by mass |
| Aluminum chelate D [condensation-accelerating catalyst, Kawaken Fine Chemicals Co., Ltd.] (10% by mass diluted solution prepared using propylene glycol monomethyl ether) | 4.17 parts by mass |
| EMALEX 715 [specific nonionic surfactant, polyoxyethylene lauryl ether, HLB: 15.6, NIHON EMULSION Co., Ltd.] (10% by mass diluted solution prepared using propylene glycol monomethyl ether) | 1.54 parts by mass |
| Sodium di(2-ethylhexyl)sulfosuccinate [ionic surfactant as antistatic agent, NOF CORPORATION] (0.2% by mass diluted solution prepared using mixed solution of water/propylene glycol monomethyl ether (mass ratio: 1/4)) | 1.54 parts by mass |
| Silica dispersion M | 15.93 parts by mass |
| Polyacrylic acid [weight-average molecular weight: 250,000] (0.1% by mass diluted solution prepared using propylene glycol monomethyl ether) | 3.50 parts by mass |

Example 23

A film-forming composition and a laminate were prepared by performing the same operation as that in Example 22, except that in Example 22, the components added to and mixed with the hydrolysis solution were changed to the components shown in the following "Composition P".

—Composition P—

| | |
|---|---|
| Diacetone alcohol [ketone-based solvent] | 45.60 parts by mass |
| Propylene glycol monomethyl ether [specific solvent: glycol ether-based solvent] | 24.80 parts by mass |
| Aluminum chelate D [condensation-accelerating catalyst, Kawaken Fine Chemicals Co., Ltd.] (10% by mass diluted solution prepared using propylene glycol monomethyl ether) | 4.17 parts by mass |

| | |
|---|---|
| EMALEX 730 [specific nonionic surfactant, polyoxyethylene lauryl ether, HLB: 17.5, NIHON EMULSION Co., Ltd.] (1% by mass diluted solution prepared using propylene glycol monomethyl ether) | 15.40 parts by mass |
| Sodium di(2-ethylhexyl)sulfosuccinate [ionic surfactant as antistatic agent, NOF CORPORATION] (0.2% by mass diluted solution prepared using mixed solution of water/propylene glycol monomethyl ether (mass ratio: 1/4)) | 1.54 parts by mass |
| Silica dispersion M | 15.93 parts by mass |
| Polyacrylic acid [weight-average molecular weight: 250,000] (0.1% by mass diluted solution prepared using propylene glycol monomethyl ether) | 3.50 parts by mass |

Example 24

A film-forming composition and a laminate were prepared by performing the same operation as that in Example 22, except that in Example 22, the components added to and mixed with the hydrolysis solution were changed to the components shown in the following "Composition Q".

—Composition Q—

| | |
|---|---|
| Diacetone alcohol [ketone-based solvent] | 45.60 parts by mass |
| Propylene glycol monomethyl ether [specific solvent: glycol ether-based solvent] | 24.80 parts by mass |
| Aluminum chelate D [condensation-accelerating catalyst, Kawaken Fine Chemicals Co., Ltd.] (10% by mass diluted solution prepared using propylene glycol monomethyl ether) | 4.17 parts by mass |
| EMALEX 750 [specific nonionic surfactant, polyoxyethylene lauryl ether, HLB: 18.4, NIHON EMULSION Co., Ltd.] (1% by mass diluted solution prepared using propylene glycol monomethyl ether) | 15.40 parts by mass |
| Sodium di(2-ethylhexyl)sulfosuccinate [ionic surfactant as antistatic agent, NOF CORPORATION] (0.2% by mass diluted solution prepared using mixed solution of water/propylene glycol monomethyl ether (mass ratio: 1/4)) | 1.54 parts by mass |
| Silica dispersion M | 15.93 parts by mass |
| Polyacrylic acid [weight-average molecular weight: 250,000] (0.1% by mass diluted solution prepared using propylene glycol monomethyl ether) | 3.50 parts by mass |

Example 25

A laminate was prepared by performing the same operation as that in Example 22, except that the film-forming composition, with which the substrate was coated, was dried by being heated for 60 minutes at 120° C.

Example 26

The components shown in the following "Composition of hydrolysis solution R" were mixed together and stirred for 12 hours at 25° C., thereby preparing a hydrolysis solution R.

—Composition of Hydrolysis Solution R—

| | |
|---|---|
| MKC (registered trademark) SILICATE MS51 [Mitsubishi Chemical Corporation] | 0.63 parts by mass |
| Silanol binder solution S | 6.33 parts by mass |
| Distilled water | 4.12 parts by mass |
| 0.1 mol/L aqueous hydrochloric acid solution | 0.07 parts by mass |

The silanol binder solution S was prepared by mixing together the components shown in the following "Composition of silanol binder solution S" and stirring the mixture for 1 hour at 25° C.

—Composition of silanol binder solution S—

| | |
|---|---|
| KURARAY POVAL (registered trademark) R-1130 [silanol-modified polyvinyl alcohol (PVA), KURARAY CO., LTD. | 2.00 parts by mass |
| Distilled water | 18.00 parts by mass |

Then, the components shown in the following "Composition T" were added to and mixed with the entirety of the hydrolysis solution R obtained as above, thereby obtaining a film-forming composition.

—Composition T—

| | |
|---|---|
| Diacetone alcohol [ketone-based solvent] | 39.15 parts by mass |
| Propylene glycol monomethyl ether [specific solvent: glycol ether-based solvent] | 27.50 parts by mass |

-continued

| | |
|---|---|
| Aluminum chelate D [condensation-accelerating catalyst, Kawaken Fine Chemicals Co., Ltd.] (10% by mass diluted solution prepared using propylene glycol monomethyl ether) | 3.57 parts by mass |
| EMALEX 715 [specific nonionic surfactant, NIHON EMULSION Co., Ltd.] (1% by mass diluted solution prepared using propylene glycol monomethyl ether) | 1.32 parts by mass |
| Sodium di(2-ethylhexyl)sulfosuccinate [ionic surfactant as antistatic agent, NOF CORPORATION] (0.2% by mass diluted solution prepared using mixed solution of water/propylene glycol monomethyl ether (mass ratio: 1/4)) | 1.32 parts by mass |
| Silica dispersion M | 13.66 parts by mass |
| Polyacrylic acid [weight-average molecular weight: 250,000] (0.1% by mass diluted solution prepared using propylene glycol monomethyl ether) | 3.00 parts by mass |

Example 27

The components shown in the following "Composition of hydrolysis solution U" were mixed together and stirred for 12 hours at 25° C., thereby preparing a hydrolysis solution U.

—Composition of Hydrolysis Solution U—

| | |
|---|---|
| MKC (registered trademark) SILICATE MS51 [Mitsubishi Chemical Corporation] | 0.63 parts by mass |
| Silanol binder solution S | 15.81 parts by mass |
| Distilled water | 4.12 parts by mass |
| 0.1 mol/L aqueous hydrochloric acid solution | 0.07 parts by mass |

Then, the components show in the following "Composition V" were added to and mixed with the entirety of the hydrolysis solution U obtained as above, thereby obtaining a film-forming composition.

—Composition V—

| | |
|---|---|
| Diacetone alcohol [ketone-based solvent] | 39.13 parts by mass |
| Propylene glycol monomethyl ether [specific solvent: glycol ether-based solvent] | 18.98 parts by mass |
| Aluminum chelate D [condensation-accelerating catalyst, Kawaken Fine Chemicals Co., Ltd.] (10% by mass diluted solution prepared using propylene glycol monomethyl ether) | 3.57 parts by mass |
| EMALEX 715 [specific nonionic surfactant, NIHON EMULSION Co., Ltd.] (10% by mass diluted solution prepared using propylene glycol monomethyl ether) | 1.32 parts by mass |
| Sodium di(2-ethylhexyl)sulfosuccinate [ionic surfactant as antistatic agent, NOF CORPORATION] (0.2% by mass diluted solution prepared using mixed solution of water/propylene glycol monomethyl ether (mass ratio: 1/4)) | 1.32 parts by mass |
| Silica dispersion M | 13.66 parts by mass |
| Polyacrylic acid [weight-average molecular weight: 250,000] (0.1% by mass diluted solution prepared using propylene glycol monomethyl ether) | 3.00 parts by mass |

Example 28

A film-forming composition and a laminate were prepared by performing the same operation as that in Example 22, except that in Example 22, the components added to and mixed with the hydrolysis solution were changed to the components shown in the following "Composition W".

—Composition W—

| | |
|---|---|
| Diacetone alcohol [ketone-based solvent] | 45.61 parts by mass |
| Propylene glycol monomethyl ether [specific solvent: glycol ether-based solvent] | 32.97 parts by mass |
| Propylene glycol [viscosity adjuster, glycol-based solvent] | 5.70 parts by mass |

-continued

| | |
|---|---|
| Aluminum chelate D [condensation-accelerating catalyst, Kawaken Fine Chemicals Co., Ltd.] (10% by mass diluted solution prepared using propylene glycol monomethyl ether) | 4.17 parts by mass |
| EMALEX 715 [specific nonionic surfactant, NIHON EMULSION Co., Ltd.] (10% by mass diluted solution prepared using propylene glycol monomethyl ether) | 1.54 parts by mass |
| Sodium di(2-ethylhexyl)sulfosuccinate [ionic surfactant as antistatic agent, NOF CORPORATION] (0.2% by mass diluted solution prepared using mixed solution of water/propylene glycol monomethyl ether (mass ratio: 1/4)) | 1.54 parts by mass |
| Silica dispersion M | 15.93 parts by mass |
| Polyacrylic acid [weight-average molecular weight: 250,000] (0.1% by mass diluted solution prepared using propylene glycol monomethyl ether) | 3.50 parts by mass |

Example 29

A film-forming composition and a laminate were prepared by performing the same operation as that in Example 24, except that in Example 24, the components added to and mixed with the hydrolysis solution were changed to the components shown in the following "Composition X".

—Composition X—

| | |
|---|---|
| Diacetone alcohol [ketone-based solvent] | 45.61 parts by mass |
| Propylene glycol monomethyl ether [specific solvent: glycol ether-based solvent] | 19.10 parts by mass |
| Propylene glycol [viscosity adjuster, glycol-based solvent] | 5.70 parts by mass |
| Aluminum chelate D [condensation-accelerating catalyst, Kawaken Fine Chemicals Co., Ltd.] (10% by mass diluted solution prepared using propylene glycol monomethyl ether) | 4.17 parts by mass |
| EMALEX 750 [specific nonionic surfactant, NIHON EMULSION Co., Ltd.] (1% by mass diluted solution prepared using propylene glycol monomethyl ether) | 15.41 parts by mass |
| Sodium di(2-ethylhexyl)sulfosuccinate [ionic surfactant as antistatic agent, NOF CORPORATION] (0.2% by mass diluted solution prepared using mixed solution of water/propylene glycol monomethyl ether (mass ratio: 1/4)) | 1.54 parts by mass |
| Silica dispersion M | 15.93 parts by mass |
| Polyacrylic acid [weight-average molecular weight: 250,000] (0.1% by mass diluted solution prepared using propylene glycol monomethyl ether) | 3.50 parts by mass |

Example 30

The components shown in the following "Composition of hydrolysis solution Y" were mixed together and stirred for 24 hours at 25° C., thereby preparing a hydrolysis solution Y.

—Composition of Hydrolysis Solution Y—

| | |
|---|---|
| Ethanol (95) [specific solvent: alcohol-based solvent] | 17.02 parts by mass |
| MKC (registered trademark) SILICATE MS51 [Mitsubishi Chemical Corporation] | 0.73 parts by mass |
| Aluminum chelate D [condensation-accelerating catalyst, Kawaken Fine Chemicals Co., Ltd.] (1% by mass diluted solution prepared using ethanol (95)) | 0.11 parts by mass |
| Distilled water | 22.29 parts by mass |

Then, the components shown in the following "Composition Z" were added to and mixed with the entirety of the hydrolysis solution Y obtained as above, thereby obtaining a film-forming composition. By using the obtained film-forming composition, a laminate was prepared in the same manner as in Example 1, except that the thickness of the film formed on the substrate was changed to 3 μm.

—Composition Z—

| | |
|---|---|
| Distilled water | 0.15 parts by mass |
| Diacetone alcohol [ketone-based solvent] | 2.89 parts by mass |
| Aluminum chelate D [condensation-accelerating catalyst, Kawaken Fine Chemicals Co., Ltd.] (10% by mass diluted solution prepared using ethanol (95)) | 2.22 parts by mass |
| EMALEX 715 [specific nonionic surfactant, polyoxyethylene lauryl ether, HLB: 15.6, NIHON EMULSION Co., Ltd.] (10% by mass diluted solution prepared using distilled water) | 0.82 parts by mass |
| Sodium di(2-ethylhexyl)sulfosuccinate [ionic surfactant as antistatic agent, NOF CORPORATION] (0.2% by mass diluted solution prepared using distilled water) | 0.84 parts by mass |
| Silica dispersion AA | 36.55 parts by mass |
| Polyacrylic acid [weight-average molecular weight: 250,000] (0.1% by mass diluted solution prepared using ethanol (95)) | 1.87 parts by mass |
| Hydroxyethyl cellulose [4,500 to 6,500 mPa · s, 2% by mass in water at 25° C., TOKYO CHEMICAL INDUSTRY CO., LTD.] (1% by mass diluted solution prepared using water/ethanol (95) = 1/1 (mass ratio)) | 14.50 parts by mass |

The silica dispersion AA was prepared by mixing together the components shown in the following "Composition of silica dispersion AA" and stirring the mixture for 1 hour at 25° C.

—Composition of Silica Dispersion AA—

| | |
|---|---|
| SNOWTEX (registered trademark) OUP [silica particles, NISSAN CHEMICAL INDUSTRIES, LTD.] | 20.40 parts by mass |
| DISPERBYK (registered trademark)-2015 [specific ionic surfactant, acid adsorptive group: carboxy group, acid value: 10 mgKOH/g, solid contents: 40% by mass, BYK-Chemie GmbH] | 1.53 parts by mass |
| Ethanol (95) [specific solvent: alcohol-based solvent] | 32.90 parts by mass |

Example 31

A film-forming composition was prepared by performing the same operation as that in Example 30, except that in Example 30, the components added to and mixed with the hydrolysis solution were changed to the components shown in the following "Composition AB".

—Composition AB—

| | |
|---|---|
| Distilled water | 0.05 parts by mass |
| Diacetone alcohol [ketone-based solvent] | 0.96 parts by mass |
| Aluminum chelate D [condensation-accelerating catalyst, Kawaken Fine Chemicals Co., Ltd.] (10% by mass diluted solution prepared using ethanol (95)) | 2.22 parts by mass |
| EMALEX 715 [specific nonionic surfactant, polyoxyethylene lauryl ether, HLB: 15.6, NIHON EMULSION Co., Ltd.] (10% by mass diluted solution prepared using distilled water) | 0.82 parts by mass |
| Sodium di(2-ethylhexyl)sulfosuccinate [ionic surfactant as antistatic agent, NOF CORPORATION] (0.2% by mass diluted solution prepared using distilled water) | 0.84 parts by mass |
| Silica dispersion AC | 38.58 parts by mass |
| Polyacrylic acid [weight-average molecular weight: 250,000] (0.1% by mass diluted solution prepared using ethanol (95)) | 1.87 parts by mass |
| Hydroxyethyl cellulose [4,500 to 6,500 mPa · s, 2% by mass in water at 25° C., TOKYO CHEMICAL INDUSTRY CO., LTD.] (1% by mass diluted solution prepared using water/ethanol (95) = 1/1 (mass ratio)) | 14.50 parts by mass |

The silica dispersion AC was prepared by mixing together the components shown in the following "Composition of silica dispersion AC" and stirring the mixture for 1 hour at 25° C.

—Composition of Silica Dispersion AC—

| | |
|---|---|
| SNOWTEX (registered trademark) OUP [silica particles, NISSAN CHEMICAL INDUSTRIES, LTD.] | 20.40 parts by mass |
| DISPERBYK (registered trademark)-2015 [specific ionic surfactant, acid adsorptive group: carboxy group, acid value: 10 mgKOH/g, solid contents: 40% by mass, BYK-Chemie GmbH] | 1.53 parts by mass |
| Ethanol (95) [specific solvent: alcohol-based solvent] | 35.94 parts by mass |

(Preparation of Laminate)

As a substrate, a polymethyl methacrylate substrate [trade name: COSMOSHINE (registered trademark) CG P, thickness: 1 mm, KURARAY CO., LTD.] was coated with the film-forming composition obtained as above by using a spray gun (model type: W-101-101G, ANEST IWATA Corporation). After coating, the polycarbonate substrate coated with the film-forming composition was left to stand for 1 minute at 25° C. After being left to stand, the film-forming composition, with which the substrate was coated, was dried by being heated for 10 minutes at 80° C., thereby preparing a laminate comprising a film having a thickness of 3 µm on the substrate.

Example 32

A laminate was prepared in the same manner as in Example 31, except that the film-forming composition obtained in Example 30 was used.

Example 33

A film-forming composition and a laminate were prepared by performing the same operation as that in Example 31, except that in Example 31, the components added to and mixed with the hydrolysis solution were changed to the components shown in the following "Composition AD".

—Composition AD—

| | |
|---|---|
| Distilled water | 0.25 parts by mass |
| Diacetone alcohol [ketone-based solvent] | 4.82 parts by mass |
| Aluminum chelate D [condensation-accelerating catalyst, Kawaken Fine Chemicals Co., Ltd.] (10% by mass diluted solution prepared using ethanol (95)) | 2.22 parts by mass |
| EMALEX 715 [specific nonionic surfactant, polyoxyethylene lauryl ether, HLB: 15.6, NIHON EMULSION Co., Ltd.] (10% by mass diluted solution prepared using distilled water) | 0.82 parts by mass |
| Sodium di(2-ethylhexyl)sulfosuccinate [ionic surfactant as antistatic agent, NOF CORPORATION] (0.2% by mass diluted solution prepared using distilled water) | 0.84 parts by mass |
| Silica dispersion AE | 34.52 parts by mass |
| Polyacrylic acid [weight-average molecular weight: 250,000] (0.1% by mass diluted solution prepared using ethanol (95)) | 1.87 parts by mass |
| Hydroxyethyl cellulose [4,500 to 6,500 mPa · s, 2% by mass in water at 25° C., TOKYO CHEMICAL INDUSTRY CO., LTD.] (1% by mass diluted solution prepared using water/ethanol (95) = 1/1 (mass ratio)) | 14.50 parts by mass |

The silica dispersion AE was prepared by mixing together the components shown in the following "Composition of silica dispersion AE" and stirring the mixture for 1 hour at 25° C.

—Composition of Silica Dispersion AE—

| | |
|---|---|
| SNOWTEX (registered trademark) OUP [silica particles, NISSAN CHEMICAL INDUSTRIES, LTD.] | 20.40 parts by mass |
| DISPERBYK (registered trademark)-2015 [specific ionic surfactant, acid adsorptive group: carboxy group, acid value: 10 mgKOH/g, solid contents: 40% by mass, BYK-Chemie GmbH] | 1.53 parts by mass |
| Ethanol (95) [specific solvent: alcohol-based solvent] | 29.86 parts by mass |

Example 34

A film-forming composition and a laminate were prepared by performing the same operation as that in Example 31, except that in Example 31, the components added to and mixed with the hydrolysis solution were changed to the components shown in the following "Composition AF".

—Composition AF—

| | |
|---|---|
| Distilled water | 0.51 parts by mass |
| Diacetone alcohol [ketone-based solvent] | 9.64 parts by mass |
| Aluminum chelate D [condensation-accelerating catalyst, Kawaken Fine Chemicals Co., Ltd.] (10% by mass diluted solution prepared using ethanol (95)) | 2.22 parts by mass |
| EMALEX 715 [specific nonionic surfactant, polyoxyethylene lauryl ether, HLB: 15.6, NIHON EMULSION Co., Ltd.] (10% by mass diluted solution prepared using distilled water) | 0.82 parts by mass |
| Sodium di(2-ethylhexyl)sulfosuccinate [ionic surfactant as antistatic agent, NOF CORPORATION] (0.2% by mass diluted solution prepared using distilled water) | 0.84 parts by mass |
| Silica dispersion AG | 29.45 parts by mass |
| Polyacrylic acid [weight-average molecular weight: 250,000] (0.1% by mass diluted solution prepared using ethanol (95)) | 1.87 parts by mass |
| Hydroxyethyl cellulose [4,500 to 6,500 mPa · s, 2% by mass in | 14.50 parts by mass | water at 25° C., TOKYO CHEMICAL INDUSTRY CO., LTD.]
(1% by mass diluted solution prepared using water/ethanol (95) = 1/1 (mass ratio))

The silica dispersion AG was prepared by mixing together the components shown in the following "Composition of silica dispersion AG" and stirring the mixture for 1 hour at 25° C.

—Composition of Silica Dispersion AG—

| | |
|---|---|
| SNOWTEX (registered trademark) OUP [silica particles, NISSAN CHEMICAL INDUSTRIES, LTD.] | 20.40 parts by mass |
| DISPERBYK (registered trademark)-2015 [specific ionic surfactant, acid adsorptive group: carboxy group, acid value: 10 mgKOH/g, solid contents: 40% by mass, BYK-Chemie GmbH] | 1.53 parts by mass |
| Ethanol (95) [specific solvent: alcohol-based solvent] | 22.45 parts by mass |

Example 35

A film-forming composition and a laminate were prepared by performing the same operation as that in Example 30, except that in Example 30, the hydrolysis solution was changed to the following composition "AH", the components added to and mixed with the hydrolysis solution were changed to the components shown in the following "Composition AI", and a hydrolysis solution AH was prepared by mixing together the components shown in the following "Composition AH of hydrolysis solution" and then stirring the mixture for 8 hours at 40° C.

—Composition of Hydrolysis Solution AH—

| | |
|---|---|
| MKC (registered trademark) SILICATE MS51 [Mitsubishi Chemical Corporation] | 1.66 parts by mass |
| Ethanol (95) [specific solvent: alcohol-based solvent] | 1.27 parts by mass |
| Distilled water | 3.21 parts by mass |
| Acetic acid [Wako Pure Chemical Industries, Ltd., special grade reagent] | 0.20 parts by mass |

Then, the components shown in the following "composition AI" were added to and mixed with the entirety of the hydrolysis solution AH obtained as above, thereby obtaining a film-forming composition.

—Composition AI—

| | |
|---|---|
| Distilled water | 1.46 parts by mass |
| Ethanol (95) [specific solvent: alcohol-based solvent] | 26.85 parts by mass |
| TOKUSO IPA (registered trademark) [specific solvent: alcohol-based solvent] | 1.80 parts by mass |
| Diacetone alcohol [ketone-based solvent, KH Neochem Co., Ltd.] | 11.95 parts by mass |
| Aluminum chelate D [condensation-accelerating catalyst, Kawaken Fine Chemicals Co., Ltd.] (10% by mass diluted solution prepared using ethanol (95)) | 5.06 parts by mass |
| EMALEX 715 [specific nonionic surfactant, polyoxyethylene lauryl ether, HLB: 15.6, NIHON EMULSION Co., Ltd.] (10% by mass diluted solution prepared using ethanol (95)) | 1.87 parts by mass |
| Sodium di(2-ethylhexyl)sulfosuccinate [ionic surfactant as antistatic agent, NOF CORPORATION] (0.2% by mass diluted solution prepared using ethanol (95)) | 1.85 parts by mass |
| DISPERBYK (registered trademark)-2015 [specific ionic surfactant, acid adsorptive group: carboxy group, acid value: 10 mgKOH/g, solid contents: 40% by mass, BYK-Chemie GmbH] | 2.24 parts by mass |
| SNOWTEX (registered trademark) OUP [silica particles, NISSAN CHEMICAL INDUSTRIES, LTD.] | 29.94 parts by mass |
| SP400 [hydroxyethyl cellulose, DAICEL FINECHEM LTD.] (3% by mass diluted solution prepared using water) | 10.64 parts by mass |

Example 36

A film-forming composition and a laminate were prepared by performing the same operation as that in Example 35, except that in Example 35, the components added to and mixed with the hydrolysis solution were changed to the components shown in the following "Composition AJ".

—Composition AJ—

| | |
|---|---|
| Distilled water | 1.80 parts by mass |
| Ethanol (95) [specific solvent: alcohol-based solvent] | 28.31 parts by mass |
| TOKUSO IPA (registered trademark) [specific solvent: alcohol-based solvent] | 1.80 parts by mass |
| Diacetone alcohol [ketone-based solvent, KH Neochem Co., Ltd.] | 11.95 parts by mass |
| Aluminum chelate D [condensation-accelerating catalyst, Kawaken Fine Chemicals Co., Ltd.] (10% by mass diluted solution prepared using ethanol (95)) | 5.06 parts by mass |

| | |
|---|---|
| EMALEX 715 [specific nonionic surfactant, polyoxyethylene lauryl ether, HLB: 15.6, NIHON EMULSION Co., Ltd.] (10% by mass diluted solution prepared using ethanol (95)) | 1.87 parts by mass |
| DISPERBYK (registered trademark)-2015 [specific ionic surfactant, acid adsorptive group: carboxy group, acid value: 10 mgKOH/g, solid contents: 40% by mass, BYK-Chemie GmbH] | 2.24 parts by mass |
| SNOWTEX (registered trademark) OUP [silica particles, NISSAN CHEMICAL INDUSTRIES, LTD.] | 29.94 parts by mass |
| SP400 [hydroxyethyl cellulose, DAICEL FINECHEM LTD.] (3% by mass diluted solution prepared using water) | 10.64 parts by mass |

Example 37

A film-forming composition and a laminate were prepared by performing the same operation as that in Example 35, except that in Example 35, the components added to and mixed with the hydrolysis solution were changed to the components shown in the following "Composition AK".

—Composition AK—

| | |
|---|---|
| Distilled water | 1.83 parts by mass |
| Ethanol (95) [specific solvent: alcohol-based solvent] | 24.20 parts by mass |
| TOKUSO IPA (registered trademark) [specific solvent: alcohol-based solvent] | 1.80 parts by mass |
| Diacetone alcohol [ketone-based solvent, KH Neochem Co., Ltd.] | 11.95 parts by mass |
| Aluminum chelate D [condensation-accelerating catalyst, Kawaken Fine Chemicals Co., Ltd.] (10% by mass diluted solution prepared using ethanol (95)) | 5.06 parts by mass |
| EMALEX 715 [specific nonionic surfactant, polyoxyethylene lauryl ether, HLB: 15.6, NIHON EMULSION Co., Ltd.] (10% by mass diluted solution prepared using ethanol (95)) | 1.87 parts by mass |
| DISPERBYK (registered trademark)-2015 [specific ionic surfactant, acid adsorptive group: carboxy group, acid value: 10 mgKOH/g, solid contents: 40% by mass, BYK-Chemie GmbH] | 2.24 parts by mass |
| SNOWTEX (registered trademark) OUP [silica particles, NISSAN CHEMICAL INDUSTRIES, LTD.] | 29.94 parts by mass |
| Polyacrylic acid [weight-average molecular weight: 250,000] (0.1% by mass diluted solution prepared using ethanol (95)) | 4.13 parts by mass |
| SP400 [hydroxyethyl cellulose, DAICEL FINECHEM LTD.] (3% by mass diluted solution prepared using water) | 10.64 parts by mass |

Example 38

A film-forming composition and a laminate were prepared by performing the same operation as that in Example 31, except that in Example 31, the hydrolysis solution was changed to the hydrolysis solution AH, and the components added to and mixed with the hydrolysis solution were changed to the components shown in the following "Composition AL".

—Composition AL—

| | |
|---|---|
| Distilled water | 1.13 parts by mass |
| Ethanol (95) [specific solvent: alcohol-based solvent] | 33.29 parts by mass |
| TOKUSO IPA (registered trademark) [specific solvent: alcohol-based solvent] | 2.13 parts by mass |
| Diacetone alcohol [ketone-based solvent, KH Neochem Co., Ltd.] | 5.52 parts by mass |
| Aluminum chelate D [condensation-accelerating catalyst, Kawaken Fine Chemicals Co., Ltd.] (10% by mass diluted solution prepared using ethanol (95)) | 5.06 parts by mass |
| EMALEX 715 [specific nonionic surfactant, polyoxyethylene lauryl ether, HLB: 15.6, NIHON EMULSION Co., Ltd.] (10% by mass diluted solution prepared using ethanol (95)) | 1.87 parts by mass |
| Sodium di(2-ethylhexyl)sulfosuccinate [ionic surfactant as antistatic agent, NOF CORPORATION] (0.2% by mass diluted solution prepared using ethanol (95)) | 1.85 parts by mass |
| DISPERBYK (registered trademark)-2015 [specific ionic surfactant, acid adsorptive group: carboxy group, acid value: 10 mgKOH/g, solid contents: 40% by mass, BYK-Chemie GmbH] | 2.24 parts by mass |

| | |
|---|---|
| SNOWTEX (registered trademark) OUP [silica particles, NISSAN CHEMICAL INDUSTRIES, LTD.] | 29.94 parts by mass |
| SP400 [hydroxyethyl cellulose, DAICEL FINECHEM LTD.] (3% by mass diluted solution prepared using water) | 10.64 parts by mass |

Example 39

A film-forming composition and a laminate were prepared by performing the same operation as that in Example 38, except that in Example 38, the components added to and mixed with the hydrolysis solution were changed to the components shown in the following "Composition AM".

—Composition AM—

| | |
|---|---|
| Distilled water | 1.48 parts by mass |
| Ethanol (95) [specific solvent: alcohol-based solvent] | 34.74 parts by mass |
| TOKUSO IPA (registered trademark) [specific solvent: alcohol-based solvent] | 2.13 parts by mass |
| Diacetone alcohol [ketone-based solvent, KH Neochem Co., Ltd.] | 5.51 parts by mass |
| Aluminum chelate D [condensation-accelerating catalyst, Kawaken Fine Chemicals Co., Ltd.] (10% by mass diluted solution prepared using ethanol (95)) | 5.06 parts by mass |
| EMALEX 715 [specific nonionic surfactant, polyoxyethylene lauryl ether, HLB: 15.6, NIHON EMULSION Co., Ltd.] (10% by mass diluted solution prepared using ethanol (95)) | 1.87 parts by mass |
| DISPERBYK (registered trademark)-2015 [specific ionic surfactant, acid adsorptive group: carboxy group, acid value: 10 mgKOH/g, solid contents: 40% by mass, BYK-Chemie GmbH] | 2.24 parts by mass |
| SNOWTEX (registered trademark) OUP [silica particles, NISSAN CHEMICAL INDUSTRIES, LTD.] | 29.94 parts by mass |
| SP400 [hydroxyethyl cellulose, DAICEL FINECHEM LTD.] (3% by mass diluted solution prepared using water) | 10.64 parts by mass |

Example 40

A film-forming composition and a laminate were prepared by performing the same operation as that in Example 38, except that in Example 38, the components added to and mixed with the hydrolysis solution were changed to the components shown in the following "Composition AN".

—Composition AN—

| | |
|---|---|
| Distilled water | 1.50 parts by mass |
| Ethanol (95) [specific solvent: alcohol-based solvent] | 30.64 parts by mass |
| TOKUSO IPA (registered trademark) [specific solvent: alcohol-based solvent] | 2.13 parts by mass |
| Diacetone alcohol [ketone-based solvent, KH Neochem Co., Ltd.] | 5.52 parts by mass |
| Aluminum chelate D [condensation-accelerating catalyst, Kawaken Fine Chemicals Co., Ltd.] (10% by mass diluted solution prepared using ethanol (95)) | 5.06 parts by mass |
| EMALEX 715 [specific nonionic surfactant, polyoxyethylene lauryl ether, HLB: 15.6, NIHON EMULSION Co., Ltd.] (10% by mass diluted solution prepared using ethanol (95)) | 1.87 parts by mass |
| DISPERBYK (registered trademark)-2015 [specific ionic surfactant, acid adsorptive group: carboxy group, acid value: 10 mgKOH/g, solid contents: 40% by mass, BYK-Chemie GmbH] | 2.24 parts by mass |
| SNOWTEX (registered trademark) OUP [silica particles, NISSAN CHEMICAL INDUSTRIES, LTD.] | 29.94 parts by mass |
| Polyacrylic acid [weight-average molecular weight: 250,000] (0.1% by mass diluted solution prepared using ethanol (95)) | 4.13 parts by mass |
| SP400 [hydroxyethyl cellulose, DAICEL FINECHEM LTD.] (3% by mass diluted solution prepared using water) | 10.64 parts by mass |

Comparative Example 1

A film-forming composition and a laminate were prepared by performing the same operation as that in Example 1, except that in Example 1, an alcohol-based solvent "ethanol (95)" was used instead of a ketone-based solvent "acetone".

Comparative Example 2

A film-forming composition and a laminate were prepared by performing the same operation as that in Example 1, except that in Example 1, an alcohol-based solvent "n-propanol" was used instead of a ketone-based solvent "acetone".

Comparative Example 3

A film-forming composition and a laminate were prepared by performing the same operation as that in Example 1, except that in Example 1, an ether-based solvent "1,2-dimethoxyethane" was used instead of a ketone-based solvent "acetone".

Comparative Example 4

A film-forming composition and a laminate were prepared by performing the same operation as that in Example 1, except that in Example 1, a glycol ether-based solvent "propylene glycol monomethyl ether" was used instead of a ketone-based solvent "acetone".

Comparative Example 5

A film-forming composition and a laminate were prepared by performing the same operation as that in Example 9, except that in Example 9, an ester-based solvent "methyl acetate" was used instead of a ketone-based solvent "diacetone alcohol".

Comparative Example 6

A film-forming composition and a laminate were prepared by performing the same operation as that in Example 9, except that in Example 9, a hydrocarbon-based solvent "xylene" was used instead of a ketone-based solvent "diacetone alcohol".

The formulation of the film-forming composition and the laminate prepared as above and the like are shown in Table 2 to Table 5.

In Table 2 to Table 5, "polyacrylic acid" is described as "PA".

In Table 2 to Table 6, "polycarbonate" is described as "PC".

In Table 5, "polymethyl methacrylate" is described as "PMMA".

"Ratio (% by mass)" in Table 2 to Table 6 means a ratio to the total mass of solvents contained in the film-forming composition.

"Ratio of specific solvent/ketone-based solvent" in Table 2 to Table 6 means a ratio (based on mass) of the content of a specific solvent to the content of a ketone-based solvent in the film-forming composition.

In the column of Formulation in Table 2 to Table 6, "—" means that the corresponding component is not mixed in.

TABLE 2

| | | Formulation | | | | | | | | | | |
|---|---|---|---|---|---|---|---|---|---|---|---|---|
| | | | | | Adhesion aid | | Surfactant | | | | | Solvent |
| | | Binder material | | | | Weight- | | Non- | | | | Water |
| | Substrate | Specific siloxane compound | Silanol-modified PVA | Silica particles | Type | average molecular weight | Ionic surfactant | ionic surfactant | Antistatic agent | Catalyst | Thickener | Ratio (% by mass) |
| Example 1 | PC | MKC SILICATE MS51 | — | SNOWTEX OUP | — | — | — | — | Sodium di(2-ethylhexyl)-sulfosuccinate | Aluminum chelate D | — | 9 |
| Example 2 | PC | MKC SILICATE MS51 | — | SNOWTEX OUP | — | — | — | — | Sodium di(2-ethylhexyl)-sulfosuccinate | Aluminum chelate D | — | 9 |
| Example 3 | PC | MKC SILICATE MS51 | — | SNOWTEX OUP | — | — | — | — | Sodium di(2-ethylhexyl)-sulfosuccinate | Aluminum chelate D | — | 9 |
| Example 4 | PC | MKC SILICATE MS51 | — | SNOWTEX OUP | — | — | — | — | Sodium di(2-ethylhexyl)-sulfosuccinate | Aluminum chelate D | — | 9 |
| Example 5 | PC | MKC SILICATE MS51 | — | SNOWTEX OUP | — | — | — | — | Sodium di(2-ethylhexyl)-sulfosuccinate | Aluminum chelate D | — | 9 |
| Example 6 | PC | MKC SILICATE MS51 | — | SNOWTEX OUP | — | — | — | — | Sodium di(2-ethylhexyl)-sulfosuccinate | Aluminum chelate D | — | 9 |
| Example 7 | PC | MKC SILICATE MS51 | — | SNOWTEX OUP | — | — | — | — | Sodium di(2-ethylhexyl)-sulfosuccinate | Aluminum chelate D | — | 9 |
| Example 8 | PC | MKC SILICATE MS51 | — | SNOWTEX OUP | — | — | — | — | Sodium di(2-ethylhexyl)-sulfosuccinate | Aluminum chelate D | — | 9 |
| Example 9 | PC | MKC SILICATE MS51 | — | SNOWTEX OUP | — | — | — | — | Sodium di(2-ethylhexyl)-sulfosuccinate | Aluminum chelate D | — | 9 |

TABLE 2-continued

| | | | | | | | | | | | | |
|---|---|---|---|---|---|---|---|---|---|---|---|---|
| Example 10 | PC | MKC SILICATE MS51 | — | SNOW-TEX OUP | PA | 25,000 | — | — | Sodium di(2-ethylhexyl)-sulfosuccinate | Aluminum chelate D | — | 9 |
| Example 11 | PC | MKC SILICATE MS51 | — | SNOW-TEX OUP | PA | 130,000 | — | — | Sodium di(2-ethylhexyl)-sulfosuccinate | Aluminum chelate D | — | 9 |
| Example 12 | PC | MKC SILICATE MS51 | — | SNOW-TEX OUP | PA | 250,000 | — | — | Sodium di(2-ethylhexyl)-sulfosuccinate | Aluminum chelate D | — | 9 |
| Example 13 | PC | MKC SILICATE MS51 | — | SNOW-TEX OUP | PA | 1,000,000 | — | — | Sodium di(2-ethylhexyl)-sulfosuccinate | Aluminum chelate D | — | 9 |

| | Formulation Solvent | | | | | | | | Drying condition | |
|---|---|---|---|---|---|---|---|---|---|---|
| | Specific solvent | | Ketone-based solvent | | Glycol-based solvent | | Other solvents | | Specific solvent/ ketone-based solvent | Drying temperature (° C.) | Drying time (min) |
| | Type | Ratio (% by mass) | Type | Ratio (% by mass) | Type | Ratio (% by mass) | Type | Ratio (% by mass) | | | |
| Example 1 | — | — | Acetone | 91 | — | — | — | — | — | 120 | 20 |
| Example 2 | Ethanol | 51 | Acetone | 40 | — | — | — | — | 1.28 | 120 | 20 |
| Example 3 | Ethanol | 51 | Cyclohexanone | 40 | — | — | — | — | 1.28 | 120 | 20 |
| Example 4 | Ethanol | 51 | Acetyl acetone | 40 | — | — | — | — | 1.28 | 120 | 20 |
| Example 5 | Ethanol | 51 | Cyclohexanone | 40 | — | — | — | — | 1.28 | 120 | 20 |
| Example 6 | Ethanol | 51 | Diacetone alcohol | 40 | — | — | — | — | 1.28 | 120 | 20 |
| Example 7 | n-Propanol | 51 | Diacetone | 40 | — | — | — | — | 1.28 | 120 | 20 |
| Example 8 | 1,2-Dimethoxyethane | 51 | Diacetone alcohol | 40 | — | — | — | — | 1.28 | 120 | 20 |
| Example 9 | Propylene glycol monomethyl ether | 51 | Diacetone alcohol | 40 | — | — | — | — | 1.28 | 120 | 20 |
| Example 10 | Propylene glycol monomethyl ether | 51 | Diacetone alcohol | 40 | — | — | — | — | 1.28 | 120 | 20 |
| Example 11 | Propylene glycol monomethyl ether | 51 | Diacetone alcohol | 40 | — | — | — | — | 1.28 | 120 | 20 |
| Example 12 | Propylene glycol monomethyl ether | 51 | Diacetone alcohol | 40 | — | — | — | — | 1.28 | 120 | 20 |
| Example 13 | Propylene glycol monomethyl ether | 51 | Diacetone alcohol | 40 | — | — | — | — | 1.28 | 120 | 20 |

TABLE 3

| | | Formulation | | | | | | | | | | |
|---|---|---|---|---|---|---|---|---|---|---|---|---|
| | | Binder material | | | Adhesion aid | | Surfactant | | | | | Solvent |
| | Sub-strate | Specific siloxane compound | Silanol-modified PVA | Silica particles | Type | Weight-average molecular weight | Ionic surfactant | Non-ionic surfactant | Antistatic agent | Catalyst | Thickener | Water Ratio (% by mass) |
| Example 14 | PC | MKC SILICATE MS51 | — | SNOWTEX OUP | PA | 250,000 | — | — | Sodium di(2-ethylhexyl)-sulfosuccinate | Aluminum chelate D | — | 9 |
| Example 15 | PC | MKC SILICATE MS51 | — | SNOWTEX OUP | PA | 250,000 | — | — | Sodium di(2-ethylhexyl)-sulfosuccinate | Aluminum chelate D | — | 9 |
| Example 16 | PC | MKC SILICATE MS51 | — | SNOWTEX OUP | PA | 250,000 | — | — | Sodium di(2-ethylhexyl)-sulfosuccinate | Aluminum chelate D | — | 9 |
| Example 17 | PC | MKC SILICATE MS51 | — | SNOWTEX OUP | PA | 250,000 | — | — | Sodium di(2-ethylhexyl)-sulfosuccinate | Aluminum chelate D | — | 9 |
| Example 18 | PC | MKC SILICATE MS51 | — | SNOWTEX OUP | PA | 250,000 | — | — | Sodium di(2-ethylhexyl)-sulfosuccinate | Aluminum chelate D | — | 9 |
| Example 19 | PC | MKC SILICATE MS51 | — | SNOWTEX OUP | PA | 250,000 | — | — | Sodium di(2-ethylhexyl)-sulfosuccinate | Aluminum chelate D | — | 9 |
| Example 20 | PC | MKC SILICATE MS51 | — | SNOWTEX OUP | PA | 250,000 | — | — | Sodium di(2-ethylhexyl)-sulfosuccinate | Aluminum chelate D | — | 9 |

| | Formulation Solvent | | | | | | | | Ratio of specific solvent/ ketone-based solvent | Drying condition | |
|---|---|---|---|---|---|---|---|---|---|---|---|
| | Specific solvent | | Ketone-based solvent | | Glycol-based solvent | | Other solvents | | | Drying temperature (° C.) | Drying time (min) |
| | Type | Ratio (% by mass) | Type | Ratio (% by mass) | Type | Ratio (% by mass) | Type | Ratio (% by mass) | | | |
| Example 14 | Propylene glycol monomethyl ether | 41 | Diacetone alcohol | 40 | Dipropylene glycol | 10 | — | — | 1.03 | 120 | 20 |
| Example 15 | Propylene glycol monomethyl ether | 41 | Diacetone alcohol | 40 | Propylene glycol | 10 | — | — | 1.03 | 120 | 20 |
| Example 16 | Propylene glycol monomethyl ether | 71 | Diacetone alcohol | 10 | Propylene glycol | 10 | — | — | 7.10 | 120 | 20 |
| Example 17 | Propylene glycol monomethyl ether | 61 | Diacetone alcohol | 20 | Propylene glycol | 10 | — | — | 3.05 | 120 | 20 |
| Example 18 | Propylene glycol monomethyl ether | 21 | Diacetone alcohol | 60 | Propylene glycol | 10 | — | — | 0.35 | 120 | 20 |
| Example 19 | Propylene glycol monomethyl ether | 46 | Diacetone alcohol | 40 | Propylene glycol | 5 | — | — | 1.15 | 120 | 20 |
| Example 20 | Propylene glycol monomethyl ether | 21 | Diacetone alcohol | 40 | Propylene glycol | 10 | — | — | 0.53 | 120 | 20 |

TABLE 4

| | | Formulation | | | | | | | | | | |
|---|---|---|---|---|---|---|---|---|---|---|---|---|
| | | Binder material | | | Adhesion aid | | Surfactant | | | | | Solvent |
| | | | | | | Weight- | Ionic | Non-ionic | | | | Water |
| | Sub-strate | Specific siloxane compound | Silanol-modified PVA | Silica particles | Type | average molecular weight | sur-factant | sur-factant | Antistatic agent | Catalyst | Thick-ener | Ratio (% by mass) |
| Example 21 | PC | MKC SILICATE MS51 | — | SNOW-TEX OUP | PA | 250,000 | DISPER-BYK-2015 | — | Sodium di(2-ethylhexyl)-sulfosuccinate | Aluminum chelate D | — | 9 |
| Example 22 | PC | MKC SILICATE MS51 | — | SNOW-TEX OUP | PA | 250,000 | DISPER-BYK-2015 | EMALEX 715 | Sodium di(2-ethylhexyl)-sulfosuccinate | Aluminum chelate D | — | 9 |
| Example 23 | PC | MKC SILICATE MS51 | — | SNOW-TEX OUP | PA | 250,000 | DISPER-BYK-2015 | EMALEX 730 | Sodium di(2-ethylhexyl)-sulfosuccinate | Aluminum chelate D | — | 9 |
| Example 24 | PC | MKC SILICATE MS51 | — | SNOW-TEX OUP | PA | 250,000 | DISPER-BYK-2015 | EMALEX 750 | Sodium di(2-ethylhexyl)-sulfosuccinate | Aluminum chelate D | — | 9 |
| Example 25 | PC | MKC SILICATE MS51 | — | SNOW-TEX OUP | PA | 250,000 | DISPER-BYK-2015 | EMALEX 715 | Sodium di(2-ethylhexyl)-sulfosuccinate | Aluminum chelate D | — | 9 |
| Example 26 | PC | MKC SILICATE MS51 | KURARAY POVAL R-1130 | SNOW-TEX OUP | PA | 250,000 | DISPER-BYK-2015 | EMALEX 715 | Sodium di(2-ethylhexyl)-sulfosuccinate | Aluminum chelate D | — | 16 |
| Example 27 | PC | MKC SILICATE MS51 | KURARAY POVAL R-1130 | SNOW-TEX OUP | PA | 250,000 | DISPER-BYK-2015 | EMALEX 715 | Sodium di(2-ethylhexyl)-sulfosuccinate | Aluminum chelate D | — | 25 |
| Example 28 | PC | MKC SILICATE MS51 | — | SNOW-TEX OUP | PA | 250,000 | DISPER-BYK-2015 | EMALEX 715 | Sodium di(2-ethylhexyl)-sulfosuccinate | Aluminum chelate D | — | 9 |
| Example 29 | PC | MKC SILICATE MS51 | — | SNOW-TEX OUP | PA | 250,000 | DISPER-BYK-2015 | EMALEX 750 | Sodium di(2-ethylhexyl)-sulfosuccinate | Aluminum chelate D | — | 9 |

| | Formulation Solvent | | | | | | | | Ratio of specific | Drying condition | |
|---|---|---|---|---|---|---|---|---|---|---|---|
| | Specific solvent | | Ketone-based solvent | | Glycol-based solvent | | Other solvents | | solvent/ ketone-based | Drying temper-ature | Drying time |
| | Type | Ratio (% by mass) | Type | Ratio (% by mass) | Type | Ratio (% by mass) | Type | Ratio (% by mass) | solvent | (° C.) | (min) |
| Example 21 | Propylene glycol monomethyl ether | 51 | Diacetone alcohol | 40 | — | — | — | — | 1.28 | 120 | 20 |
| Example 22 | Propylene glycol monomethyl ether | 51 | Diacetone alcohol | 40 | — | — | — | — | 1.28 | 120 | 20 |
| Example 23 | Propylene glycol monomethyl ether | 51 | Diacetone alcohol | 40 | — | — | — | — | 1.28 | 120 | 20 |
| Example 24 | Propylene glycol monomethyl ether | 51 | Diacetone alcohol | 40 | — | — | — | — | 1.28 | 120 | 20 |
| Example 25 | Propylene glycol monomethyl ether | 51 | Diacetone alcohol | 40 | — | — | — | — | 1.28 | 120 | 20 |

TABLE 4-continued

| | | | | | | | | | | | |
|---|---|---|---|---|---|---|---|---|---|---|---|
| Example 26 | Propylene glycol monomethyl ether | 44 | Diacetone alcohol | 40 | — | — | — | — | 1.28 | 120 | 20 |
| Example 27 | Propylene glycol monomethyl ether | 35 | Diacetone alcohol | 40 | — | — | — | — | 1.28 | 120 | 20 |
| Example 28 | Propylene glycol monomethyl ether | 46 | Diacetone alcohol | 40 | Propylene glycol | 5 | — | — | 1.15 | 120 | 20 |
| Example 29 | Propylene glycol monomethyl ether | 46 | Diacetone alcohol | 40 | Propylene glycol | 5 | — | — | 1.15 | 120 | 20 |

TABLE 5

| | | Formulation | | | | | | | | | | Solvent |
|---|---|---|---|---|---|---|---|---|---|---|---|---|
| | | Binder material | | | Adhesion aid | | Surfactant | | | | | Water |
| | Substrate | Specific siloxane compound | Silanol-modified PVA | Silica particles | Type | Weight-average molecular weight | Ionic surfactant | Non-ionic surfactant | Antistatic agent | Catalyst | Thickener | Ratio (% by mass) |
| Example 30 | PC | MKC SILICATE MS51 | — | SNOWTEX OUP | PA | 250,000 | DISPER-BYK-2015 | EMALEX 715 | Sodium di(2-ethylhexyl)-sulfosuccinate | Aluminum chelate D | Hydroxyethyl cellulose | 48 |
| Example 31 | PMMA | MKC SILICATE MS51 | — | SNOWTEX OUP | PA | 250,000 | DISPER-BYK-2015 | EMALEX 715 | Sodium di(2-ethylhexyl)-sulfosuccinate | Aluminum chelate D | Hydroxyethyl cellulose | 48 |
| Example 32 | PMMA | MKC SILICATE MS51 | — | SNOWTEX OUP | PA | 250,000 | DISPER-BYK-2015 | EMALEX 715 | Sodium di(2-ethylhexyl)-sulfosuccinate | Aluminum chelate D | Hydroxyethyl cellulose | 48 |
| Example 33 | PMMA | MKC SILICATE MS51 | — | SNOWTEX OUP | PA | 250,000 | DISPER-BYK-2015 | EMALEX 715 | Sodium di(2-ethylhexyl)-sulfosuccinate | Aluminum chelate D | Hydroxyethyl cellulose | 48 |
| Example 34 | PMMA | MKC SILICATE MS51 | — | SNOWTEX OUP | PA | 250,000 | DISPER-BYK-2015 | EMALEX 715 | Sodium di(2-ethylhexyl)-sulfosuccinate | Aluminum chelate D | Hydroxyethyl cellulose | 48 |
| Example 35 | PC | MKC SILICATE MS51 | — | SNOWTEX OUP | — | — | DISPER-BYK-2015 | EMALEX 715 | Sodium di(2-ethylhexyl)-sulfosuccinate | Aluminum chelate D | Hydroxyethyl cellulose | 48 |
| Example 36 | PC | MKC SILICATE MS51 | — | SNOWTEX OUP | — | — | DISPER-BYK-2015 | EMALEX 715 | — | Aluminum chelate D | Hydroxyethyl cellulose | 48 |
| Example 37 | PC | MKC SILICATE MS51 | — | SNOWTEX OUP | PA | 250,000 | DISPER-BYK-2015 | EMALEX 715 | — | Aluminum chelate D | Hydroxyethyl cellulose | 48 |
| Example 38 | PMMA | MKC SILICATE MS51 | — | SNOWTEX OUP | — | — | DISPER-BYK-2015 | EMALEX 715 | Sodium di(2-ethylhexyl)-sulfosuccinate | Aluminum chelate D | Hydroxyethyl cellulose | 48 |
| Example 39 | PMMA | MKC SILICATE MS51 | — | SNOWTEX OUP | — | — | DISPER-BYK-2015 | EMALEX 715 | — | Aluminum chelate D | Hydroxyethyl cellulose | 48 |
| Example 40 | PMMA | MKC SILICATE MS51 | — | SNOWTEX OUP | PA | 250,000 | DISPER-BYK-2015 | EMALEX 715 | — | Aluminum chelate D | Hydroxyethyl cellulose | 48 |

TABLE 5-continued

| | | Formulation Solvent | | | | | | | | | Drying condition | |
|---|---|---|---|---|---|---|---|---|---|---|---|---|
| | | Specific solvent | | Ketone-based solvent | | Glycol-based solvent | | Other solvents | | Ratio of specific solvent/ ketone-based solvent | Drying temperature (° C.) | Drying time (min) |
| | | Type | Ratio (% by mass) | Type | Ratio (% by mass) | Type | Ratio (% by mass) | Type | Ratio (% by mass) | | | |
| Example 30 | | Ethanol | 49 | Diacetone alcohol | 3 | — | — | — | — | 16.47 | 120 | 20 |
| Example 31 | | Ethanol | 51 | Diacetone alcohol | 1 | — | — | — | — | 51.40 | 80 | 10 |
| Example 32 | | Ethanol | 49 | Diacetone alcohol | 3 | — | — | — | — | 16.47 | 80 | 10 |
| Example 33 | | Ethanol | 47 | Diacetone alcohol | 5 | — | — | — | — | 9.5 | 80 | 10 |
| Example 34 | | Ethanol | 42 | Diacetone alcohol | 10 | — | — | — | — | 4.24 | 80 | 10 |
| Example 35 | | Ethanol/IPA | 39 | Diacetone alcohol | 13 | — | — | — | — | 3.00 | 120 | 20 |
| Example 36 | | Ethanol/IPA | 39 | Diacetone alcohol | 13 | — | — | — | — | 3.00 | 120 | 20 |
| Example 37 | | Ethanol/IPA | 39 | Diacetone alcohol | 13 | — | — | — | — | 3.00 | 120 | 20 |
| Example 38 | | Ethanol/IPA | 46 | Diacetone alcohol | 6 | — | — | — | — | 7.66 | 80 | 10 |
| Example 39 | | Ethanol/IPA | 46 | Diacetone alcohol | 6 | — | — | — | — | 7.66 | 80 | 10 |
| Example 40 | | Ethanol/IPA | 46 | Diacetone alcohol | 6 | — | — | — | — | 7.66 | 80 | 10 |

TABLE 6

| | | Formulation | | | | | | | | | | |
|---|---|---|---|---|---|---|---|---|---|---|---|---|
| | | Binder material | | | Adhesion aid | | Surfactant | | | | Solvent | |
| | | | | | | | | | | | Water | |
| | Substrate | Specific siloxane compound | Silanol-modified PVA | Silica particles | Type | Weight-average molecular weight | Ionic surfactant | Nonionic surfactant | Antistatic agent | Catalyst | Ratio (% by mass) | Specific solvent Type |
| Comparative example 1 | PC | MKC SILICATE MS51 | — | SNOWTEX OUP | — | — | — | — | Sodium di(2-ethylhexyl)-sulfosuccinate | Aluminum chelate D | 9 | Ethanol |
| Comparative example 2 | PC | MKC SILICATE MS51 | — | SNOWTEX OUP | — | — | — | — | Sodium di(2-ethylhexyl)-sulfosuccinate | Aluminum chelate D | 9 | n-Propanol |
| Comparative example 3 | PC | MKC SILICATE MS51 | — | SNOWTEX OUP | — | — | — | — | Sodium di(2-ethylhexyl)-sulfosuccinate | Aluminum chelate D | 9 | 1,2-Dimethoxyethane |
| Comparative example 4 | PC | MKC SILICATE MS51 | — | SNOWTEX OUP | — | — | — | — | Sodium di(2-ethylhexyl)-sulfosuccinate | Aluminum chelate D | 9 | Propylene glycol monomethyl ether |

TABLE 6-continued

| | | | | | | | | | | | |
|---|---|---|---|---|---|---|---|---|---|---|---|
| Comparative example 5 | PC | MKC SILICATE MS51 | — | SNOW-TEX OUP | — | — | — | — | Sodium di(2-ethylhexyl)-sulfosuccinate | Aluminum chelate D | 9 | Propylene glycol monomethyl ether |
| Comparative example 6 | PC | MKC SILICATE MS51 | — | SNOW-TEX OUP | — | — | — | — | Sodium di(2-ethylhexyl)-sulfosuccinate | Aluminum chelate D | 9 | Propylene glycol monomethyl ether |

| | Formulation Solvent | | | | | | | | |
|---|---|---|---|---|---|---|---|---|---|
| | Specific solvent | Ketone-based solvent | | Glycol-based solvent | | Other solvents | | Ratio of specific solvent/ ketone-based solvent | Drying condition | |
| | Ratio (% by mass) | Type | Ratio (% by mass) | Type | Ratio (% by mass) | Type | Ratio (% by mass) | | Drying temperature (° C.) | Drying time (min) |
| Comparative example 1 | 91 | — | — | — | — | — | — | — | 120 | 20 |
| Comparative example 2 | 91 | — | — | — | — | — | — | — | 120 | 20 |
| Comparative example 3 | 91 | — | — | — | — | — | — | — | 120 | 20 |
| Comparative example 4 | 91 | — | — | — | — | — | — | — | 120 | 20 |
| Comparative example 5 | 51 | — | — | — | — | Methyl acetate | 40 | — | 120 | 20 |
| Comparative example 6 | 51 | — | — | — | — | Xylene | 40 | — | 120 | 20 |

[Evaluation]

By using the film-forming compositions and the laminates prepared as above, the following performance evaluation was performed. The results are shown in Table 7, Table 8, and Table 9.

1. Adhesiveness of Film

Based on Japanese Industrial Standards (JIS) K5600 (cross-cut method), a crosshatch test was performed on the film, and the adhesiveness between the substrate and the film was evaluated according to the following evaluation standards. During the crosshatch test, by setting a cutting interval to be 2 mm, twenty five 2 mm×2 mm square lattices were formed.

In the following evaluation standards, "AAA", "AA", "A" and "B" are acceptable levels for practical use.

—Evaluation Standards of Adhesiveness of Film—

AAA: No peeling was observed.

AA: It was found that peeling occurred in the form of a thin strip on a cutting line.

A: It was found that peeling obviously occurred on a cutting line.

B: It was found that peeling occurred in the vicinity of a point of intersection between cutting lines.

C: One or more lattices were peeled.

2. Transparency of Laminate

The haze of the laminate was measured using a haze meter (model number: NDH 5000, NIPPON DENSHOKU INDUSTRIES Co., LTD.), and the measured value was adopted as an index for evaluating transparency. The haze was measured in a state where the substrate surface of the laminate, that is, a surface of the laminate that is opposite to a surface on which the film is formed faced a light source.

In this evaluation test, the lower the measured value of haze, the better the transparency of the laminate. Furthermore, a laminate having excellent transparency means that the transparency of the film is excellent. Regarding the measured value of haze, a haze equal to or lower than 2% is an acceptable level for practical use.

3. Contact Angle of Film

Under the condition of an atmospheric temperature of 25° C., 1 µL of pure water was added dropwise to the surface of the film, and a contact angle (unit: °) was measured 5 times by a θ/2 method. The average of the measured values was adopted as a water contact angle. As a measurement apparatus, a fully automatic contact angle meter (model number: DM-701, Kyowa Interface Science Co., LTD.) was used.

The lower the value of the contact angle of the film, the better the hydrophilicity and the antifogging properties of the film.

4. Antifouling Properties

A glass container with a lid was filled with the laminate and SILICONE SEALANT 1527W (trade name, Tianshan New Materials Technologies Co., Ltd.) and sealed. The sealed glass container was put into a thermo-hygrostat (model type: SH-641, ESPEC CORP) kept under the condition of 65° C. and 25% RH, and left to stand for 150 hours. After the glass container was being left to stand, the laminate was taken out of the sealed glass container, and a contact angle of the film was measured by the same method as that in "3. Contact angle of film" described above.

The smaller the value of the contact angle of the film after being left to stand, the better the antifouling properties of the film against silicone gas.

5. Amount of Water Absorbed

The mass of the laminate was measured, and the measured value was adopted as "initial mass". Then, a hot water bath with a temperature of 60° C. was prepared. Under the conditions of an atmospheric temperature of 25° C. and a relative humidity of 50%, only a 5 cm×5 cm region of the film in the laminate was brought into contact with the vapor of the hot water bath in a state where a distance of 5 cm was being maintained between the surface of water in the hot water bath and the film. The film was brought into contact with the vapor to such an extent that the laminate did not drip water in a case where the laminate was tilted vertically. Thereafter, the mass of the laminate was measured, and the measured value was adopted as "mass after test". From the initial mass and the mass after test, an increment of mass resulting from the test was calculated, and a mass per unit area brought into contact with the vapor was determined and adopted as the amount of water absorbed (unit: mg/cm$^2$).

The larger the amount of water absorbed, the stronger the tendency for the film to easily swell.

6. Coating Suitability (1) Coating Suitability for Polycarbonate Substrate

One surface of a polycarbonate substrate (size: 200 mm×200 mm, thickness: 0.5 mm) disposed horizontally was coated with any of the film-forming compositions of Example 1 to Example 30 by using a spray gun (model type: W-101-101G, ANEST IWATA Corporation). After coating, the polycarbonate substrate coated with the film-forming composition was left to stand for 30 seconds at 25° C. After being left to stand, the polycarbonate substrate was vertically tilted, and then the film-forming composition on the polycarbonate substrate was dried by being heated for 20 minutes at 120° C. After drying, the surface condition of the film formed on the polycarbonate substrate was visually observed, and the coating suitability was evaluated according to the following evaluation standards.

In the following evaluation standards, "A" and "B" are acceptable levels for practical use.

(2) Coating Suitability for Polymethyl Methacrylate Substrate

One surface of a polymethyl methacrylate substrate [size: 200 mm×200 mm, thickness: 1 mm] disposed horizontally was coated with any of the film-forming compositions of Example 31 of Example 34 by using a spray gun (model type: W-101-101G, ANEST IWATA Corporation). After coating, the polymethyl methacrylate substrate coated with the film-forming composition was left to stand for 30 seconds at 25° C. Thereafter, the polymethyl methacrylate substrate was vertically tilted, and then the film-forming composition on the polymethyl methacrylate substrate was dried by being heated for 10 minutes at 80° C. After drying, the surface condition of the film formed on the polymethyl methacrylate substrate was visually observed, and the coating suitability was evaluated according to the following evaluation standards.

In the following evaluation standards, "A" and "B" are acceptable levels for practical use.

—Evaluation Standards for Coating Suitability—

A: No trace of liquid dripping was observed.

B: Although a big trace of liquid dripping was not observed, a small trace of liquid dripping was slightly observed.

Specifically, a trace of liquid dripping having a width less than 1 cm and a length less than 1 cm was observed.

C: A big trace of liquid dripping was observed.

Specifically, a trace of liquid dripping having a width equal to or greater than 1 cm and a length equal to or greater than 1 cm was visually observed.

TABLE 7

| | Contact angle (°) | Antifouling properties Contact angle (°) | Transparency Haze (%) | Amount of water absorbed (mg/cm$^2$) | Adhesiveness | Coating suitability |
|---|---|---|---|---|---|---|
| Example 1 | 12.1 | 86.3 | 0.8 | 0.5 | B | B |
| Example 2 | 11.2 | 87.4 | 0.7 | 0.5 | A | B |
| Example 3 | 13.1 | 85.8 | 1.2 | 0.5 | A | B |
| Example 4 | 10.7 | 85.0 | 0.4 | 0.5 | A | B |
| Example 5 | 11.0 | 84.0 | 0.5 | 0.5 | A | B |
| Example 6 | 10.2 | 84.3 | 0.4 | 0.5 | A | B |
| Example 7 | 10.8 | 85.5 | 0.4 | 0.5 | A | B |
| Example 8 | 12.5 | 86.2 | 0.5 | 0.5 | A | B |
| Example 9 | 9.8 | 84.3 | 0.4 | 0.5 | A | B |
| Example 10 | 10.2 | 84.6 | 0.4 | 0.6 | AA | B |
| Example 11 | 9.9 | 83.1 | 0.4 | 0.6 | AAA | B |
| Example 12 | 9.5 | 82.5 | 0.4 | 0.6 | AAA | B |
| Example 13 | 9.7 | 82.4 | 0.5 | 0.6 | AAA | B |
| Example 14 | 11.5 | 83.3 | 0.5 | 0.6 | AAA | A |
| Example 15 | 10.8 | 84.5 | 0.4 | 0.6 | AAA | A |
| Example 16 | 12.6 | 85.0 | 0.4 | 0.6 | A | A |
| Example 17 | 9.7 | 84.8 | 0.4 | 0.6 | AA | A |
| Example 18 | 10.5 | 87.4 | 0.4 | 0.6 | A | B |
| Example 19 | 9.9 | 82.7 | 0.4 | 0.6 | AA | A |
| Example 20 | 10.4 | 85.6 | 0.4 | 0.6 | B | A |
| Example 21 | 8.1 | 33.5 | 0.4 | 0.7 | AA | B |
| Example 22 | 7.8 | 16.1 | 0.4 | 0.7 | AA | B |
| Example 23 | 8.0 | 12.5 | 0.5 | 0.7 | AA | B |

TABLE 7-continued

| | Evaluation | | | | | |
|---|---|---|---|---|---|---|
| | Contact angle (°) | Antifouling properties Contact angle (°) | Transparency Haze (%) | Amount of water absorbed (mg/cm$^2$) | Adhesiveness | Coating suitability |
| Example 24 | 8.0 | 9.8 | 0.7 | 0.7 | AA | B |
| Example 25 | 7.4 | 15.3 | 0.4 | 0.3 | AA | B |
| Example 26 | 8.0 | 80.3 | 0.5 | 2.5 | A | B |
| Example 27 | 8.5 | 78.5 | 0.7 | 5.0 | B | B |
| Example 28 | 7.9 | 11.9 | 0.4 | 0.7 | AA | A |
| Example 29 | 7.5 | 9.5 | 0.4 | 0.7 | AA | A |

TABLE 8

| | Evaluation | | | | | |
|---|---|---|---|---|---|---|
| | Contact angle (°) | Antifouling properties Contact angle (°) | Transparency Haze (%) | Amount of water absorbed (mg/cm$^2$) | Adhesiveness | Coating suitability |
| Example 30 | 9.0 | 9.6 | 0.7 | 2.1 | B | A |
| Example 31 | 8.6 | 9.7 | 0.7 | 2.1 | A | A |
| Example 32 | 8.8 | 9.3 | 0.7 | 2.1 | AA | A |
| Example 33 | 9.1 | 9.6 | 0.8 | 2.1 | AA | A |
| Example 34 | 9.1 | 9.6 | 1.3 | 2.1 | A | A |
| Example 35 | 9.3 | 9.7 | 1.0 | 2.1 | AA | A |
| Example 36 | 9.5 | 9.6 | 1.0 | 2.1 | AA | A |
| Example 37 | 9.4 | 9.8 | 1.0 | 2.1 | AAA | A |
| Example 38 | 9.2 | 9.8 | 0.8 | 2.1 | A | A |
| Example 39 | 9.6 | 9.6 | 0.8 | 2.1 | A | A |
| Example 40 | 9.4 | 9.5 | 0.8 | 2.1 | AA | A |

TABLE 9

| | Evaluation | | | | | |
|---|---|---|---|---|---|---|
| | Contact angle (°) | Antifouling properties Contact angle (°) | Transparency Haze (%) | Amount of water absorbed (mg/cm$^2$) | Adhesiveness | Coating suitability |
| Comparative example 1 | 11.5 | 86.4 | 0.5 | 0.5 | C | B |
| Comparative example 2 | 11.3 | 86.4 | 0.4 | 0.5 | C | B |
| Comparative example 3 | 12.1 | 88.9 | 0.5 | 0.5 | C | B |
| Comparative example 4 | 11.2 | 87.3 | 0.4 | 0.5 | C | B |
| Comparative example 5 | 12.5 | 87.1 | 11.5 | 0.5 | B | B |
| Comparative example 6 | 12.9 | 86.4 | 15.3 | 0.5 | B | B |

As shown in Table 7 and Table 8, the films, which were formed using the film-forming compositions of Example 1 to Example 34 containing the hydrolysate of the specific siloxane compound, the silica particles, the ketone-based solvent, and water, exhibited excellent adhesiveness with respect to the substrate. Furthermore, the laminates comprising the films formed using the film-forming compositions of Example 1 to Example 40 had excellent transparency.

In addition, the films formed using the film-forming compositions of Example 1 to Example 40 had a small water contact angle. It is considered that these films may have excellent antifogging properties.

In contrast, as shown in Table 9, the films, which were formed using the film-forming compositions of Comparative Example 1 to Comparative Example 4 containing the specific solvent instead of the ketone-based solvent, exhibited adhesiveness markedly poorer than that of the films formed using the film-forming compositions of examples.

Furthermore, the laminates, which comprised the film formed using the film-forming composition of Comparative Example 5 containing the specific solvent instead of the ketone-based solvent and methyl acetate as an ester-based solvent and the film formed using the film-forming composition of Comparative Example 6 containing the specific solvent instead of the ketone-based solvent and xylene as a hydrocarbon-based solvent, had transparency markedly poorer than that of the laminates comprising the films formed using the film-forming compositions of examples.

The film formed using the film-forming composition (for example, Example 2) containing the hydrolysate of the specific siloxane compound, the silica particles, the ketone-based solvent, the specific solvent, and water exhibited adhesiveness much better than that of the film formed using the film-forming composition (for example, Example 1) which did not contain the specific solvent.

The films formed using film-forming compositions (for example, Examples 10 to 13) containing the polyacrylic acid exhibited adhesiveness much better than that of the film formed using the film-forming composition (for example, Example 9) which did not contain a polyacrylic acid.

The film formed using the film-forming composition (for example, Example 21) containing the specific ionic surfactant had antifouling properties markedly better than those of the film formed using the film-forming composition (for example, Example 2) which did not contain the specific ionic surfactant.

The film formed using the film-forming composition (for example, Example 22) further containing the specific nonionic surfactant in addition to the specific ionic surfactant had antifouling properties much better than those of the film formed using the film-forming composition (for example, Example 21) which contained the specific ionic surfactant but did not contain the specific nonionic surfactant.

In Example 25 in which the film-forming composition with which the substrate was coated was dried for 60 minutes, the amount of water absorbed into the film was smaller than that in Example 22 in which the film-forming composition was dried for 20 minutes. This result shows that the film hardly swells by moisture and has further improved adhesiveness.

The films formed using the film-forming compositions (for example, Example 26 and Example 27) in which a portion of the hydrolysate of the specific siloxane compound was substituted with silanol-modified polyvinyl alcohol absorbed a large amount of water compared to the film-forming composition (for example, Example 22) which did not contain silanol-modified polyvinyl alcohol, and had poor adhesiveness.

[Application to Monitoring Camera Cover]

Example 41 to Example 69

The inner surface of a housing replacement cover RCP7C used in an outdoor dome housing A-ODP7C1A for a network camera from Sony Corporation was coated with the film-forming composition prepared in each of the examples (Example 1 to Example 29) by using a spray gun (model type: W-101-101G, ANEST IWATA Corporation). Then, the film-forming composition, with which the inner surface was coated, was dried for 20 minutes at 120° C. (the film-forming composition prepared in Example 25 was dried for 60 minutes), thereby obtaining a camera cover whose inner surface was coated with a film (thickness after drying: 100 μm). Thereafter, a hot water bath with a temperature of 60° C. was prepared. The inner surface of the obtained camera cover coated with the film was brought into contact with the vapor of the hot water bath for 2 minutes in a state where a distance of 5 cm was being maintained between the surface of water in the hot water bath and the inner surface.

As a comparative test, the inner surface of a housing replacement cover RCP7C on which the film formed of the film-forming composition was not provided was brought into contact with vapor by the same method as that described above.

As a result, while the inner surface of the camera cover on which the film was not formed was fogged, the inner surface of the camera cover on which the film was formed was not fogged. This result reveals that by the film-forming compositions of Example 1 to Example 29, a film exhibiting excellent antifogging properties can be formed.

Example 70 to Example 73

Camera covers were obtained by coating the inner surface of a housing replacement cover RCP7C with a film in the same manner as in Example 41 to Example 69, except that the film-forming compositions prepared in Example 30 and Example 35 to Example 37 were used, and the thickness of the film after drying was set to be 3 μm. Then, a hot water bath with a temperature of 60° C. was prepared, and the inner surface of each of the obtained camera covers coated with the film was brought into contact with the vapor of the hot water bath for 2 minutes in a state where a distance of 5 cm was being maintained between the surface of water in the hot water bath and the inner surface.

As a result, the inner surface of the camera cover on which the film was formed was not fogged. This result reveals that by the film-forming compositions of Example 30 and Example 35 to Example 37, a film exhibiting excellent antifogging properties can be formed.

Example 74 to Example 80

The inner surface of a housing replacement cover (trade name: BKC-13L, PLACO CO., LTD.) was coated with the film-forming composition prepared in each of the examples (Example 31 to Example 34 and Example 38 to Example 40) by using a spray gun (model type: W-101-101G, ANEST IWATA Corporation). Then, the film-forming composition, with which the inner surface was coated, was dried for 10 minutes at 80° C., thereby obtaining a camera cover whose inner surface was coated with a film (thickness after drying: 3 μm). Thereafter, a hot water bath with a temperature of 60° C. was prepared, and the inner surface of the obtained camera cover coated with the film was brought into contact with the vapor of the hot water bath for 2 minutes in a state where a distance of 5 cm was being maintained between the surface of water in the hot water bath and the inner surface.

As a comparative test, the inner surface of a housing replacement cover BKC-13L on which the film formed of the film-forming composition was not provided was brought into contact with vapor by the same method as that described above.

As a result, while the inner surface of the camera cover on which the film was not formed was fogged, the inner surface of the camera cover on which the film was formed was not fogged. This result reveals that by the film-forming compositions of Example 31 to Example 34 and Example 38 to Example 40, a film exhibiting excellent antifogging properties can be formed.

[Application to Automobile Headlight Lens]

Example 81 to Example 109

The inner surface of a W219 repairing headlight lens from Office K was coated with the film-forming composition prepared in each of the examples (Example 1 to Example 29) by using a spray gun (model type: W-101-101G, ANEST IWATA Corporation). Then, the film-forming composition, with which the inner surface was coated, was dried for 20 minutes at 120° C. (the film-forming composition prepared in Example 25 was dried for 60 minutes), thereby obtaining a headlight lens whose inner surface was coated with a film. Thereafter, a hot water bath with a temperature of 60° C. was prepared, and the inner surface of the obtained headlight lens coated with the film was brought into contact with the vapor of the hot water bath for 2 minutes in a state where a distance of 5 cm was being maintained between the surface of water in the hot water bath and the inner surface.

As a comparative test, the inner surface of a headlight lens on which the film formed of the film-forming composition was not provided was brought into contact with vapor by the same method as that described above.

As a result, while the inner surface of the headlight lens on which the film was not formed was fogged, the inner surface of the headlight lens on which the film was formed was not fogged. This result reveals that by the film-forming compositions of Example 1 to Example 29, a film exhibiting excellent antifogging properties can be formed.

Example 110 to Example 113

Headlight lenses were obtained by coating the inner surface of a W219 repairing headlight lens from Office K with a film in the same manner as in Example 81 to Example 109, except that the film-forming compositions prepared in Example 30 and Example 35 to Example 37 were used, and the thickness of the film after drying was set to be 3 μm. Then, a hot water bath with a temperature of 60° C. was prepared, and the inner surface of each of the obtained headlight lenses coated with the film was brought into contact with the vapor of the hot water bath for 2 minutes in a state where a distance of 5 cm was being maintained between the surface of water in the hot water bath and the inner surface.

As a result, the inner surface of the headlight lens on which the film was formed was not fogged. This result reveals that by the film-forming compositions of Example 30 and Example 35 to Example 37, a film exhibiting excellent antifogging properties can be formed.

[Application to Automobile Taillight Lens]

Example 114 to Example 120

The inner surface of a lens cover of an LED taillight (product number: OET 153) for VITZ from Motor Produce was coated with the film-forming composition prepared in each of the examples (Example 31 to Example 34 and Example 38 to Example 40) by using a spray gun (model type: W-101-101G, ANEST IWATA Corporation). Then, the film-forming composition, with which the inner surface was coated, was dried for 10 minutes at 80° C., thereby obtaining a taillight lens whose inner surface was coated with a film (thickness after drying: 3 μm). Thereafter, a hot water bath with a temperature of 60° C. was prepared, and the inner surface of the obtained taillight lens coated with the film was brought into contact with the vapor of the hot water bath for 2 minutes in a state where a distance of 5 cm was being maintained between the surface of water in the hot water bath and the inner surface.

As a comparative test, the inner surface of a taillight lens on which the film formed of the film-forming composition was not provided was brought into contact with vapor by the same method as that described above.

As a result, while the inner surface of the taillight lens on which the film was not formed was fogged, the inner surface of the taillight lens on which the film was formed was not fogged. This result reveals that by the film-forming compositions of Example 31 to Example 34 and Example 38 to Example 40, a film exhibiting excellent antifogging properties can be formed.

The entire disclosures of JP2016-121286 filed on Jun. 17, 2016 and JP2016-222756 field on Nov. 15, 2016 are incorporated into the present specification by reference.

All the documents, patent applications, and technical standards described in the present specification are incorporated into the present specification by reference as if each of the documents, the patent applications, and the technical standards is specifically and independently described and incorporated into the present specification by reference.

What is claimed is:

1. A film-forming composition comprising:
   (a) a hydrolysate of a siloxane compound represented by Formula (1);
   (b) silica particles;
   (c) a ketone-based solvent;
   (d) at least one kind of solvent selected from the group consisting of an alcohol-based solvent, a glycol ether-based solvent, and an ether-based solvent; and
   (e) water,

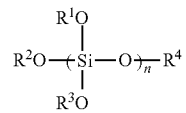

Formula (1)

in Formula (1), $R^1$, $R^2$, $R^3$, and $R^4$ each independently represent a monovalent organic group having 1 to 6 carbon atoms, and n represents an integer of 2 to 20;
wherein a ratio of the total content of the (d) at least one kind of solvent selected from the group consisting of an alcohol-based solvent, a glycol ether-based solvent, and an ether-based solvent to the content of the (c) ketone-based solvent in the film-forming composition is 0.1 to 16.5 based on mass.

2. The film-forming composition according to claim 1, further comprising:
   at least one kind of resin selected from the group consisting of a urethane-based resin and a (meth)acrylic resin.

3. The film-forming composition according to claim 2, wherein the (meth)acrylic resin is a polyacrylic acid.

4. A manufacturing method of a laminate, comprising:
   forming a film by applying the film-forming composition according to claim 1 onto a substrate.

5. The manufacturing method of a laminate according to claim 4,
   wherein the film-forming composition further comprises at least one kind of resin selected from the group consisting of a urethane-based resin and a (meth)acrylic resin.

6. The manufacturing method of a laminate according to claim 5,
   wherein the (meth)acrylic resin is a polyacrylic acid.

7. The manufacturing method of a laminate according to claim 4,
   wherein the substrate is a polycarbonate substrate or a polymethyl methacrylate substrate.

* * * * *